United States Patent
Jee et al.

(10) Patent No.: US 12,448,714 B2
(45) Date of Patent: Oct. 21, 2025

(54) WASHING MACHINE AND METHOD OF CONTROLLING THE WASHING MACHINE

(71) Applicant: Samsung Electronics Co., Ltd., Suwon-si (KR)

(72) Inventors: Yongkeun Jee, Suwon-si (KR); Mijo Kang, Suwon-si (KR); Kyungah Chang, Suwon-si (KR); Jungwon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 245 days.

(21) Appl. No.: 18/203,267

(22) Filed: May 30, 2023

(65) Prior Publication Data

US 2024/0018711 A1 Jan. 18, 2024

Related U.S. Application Data

(63) Continuation of application No. PCT/KR2023/006545, filed on May 15, 2023.

(30) Foreign Application Priority Data

Jul. 18, 2022 (KR) .......................... 10-2022-0088550
Oct. 31, 2022 (KR) .......................... 10-2022-0143019

(51) Int. Cl.
*D06F 34/05* (2020.01)
*D06F 23/02* (2006.01)
(Continued)

(52) U.S. Cl.
CPC .............. *D06F 34/05* (2020.02); *D06F 23/02* (2013.01); *D06F 33/30* (2020.02); *D06F 34/20* (2020.02);
(Continued)

(58) Field of Classification Search
CPC .......... D06F 34/05; D06F 34/20; D06F 33/30; D06F 23/02; D06F 37/266; D06F 39/14;
(Continued)

(56) References Cited

U.S. PATENT DOCUMENTS 9,739,004 B2    8/2017   Ha et al.
10,904,698 B2   1/2021   Wootton et al.
(Continued)

FOREIGN PATENT DOCUMENTS

CN    113625625 A    11/2021
CN    113774627 A    12/2021
(Continued)

OTHER PUBLICATIONS

CN113774627A—machine translation (Year: 2021).*
(Continued)

*Primary Examiner* — Tinsae B Ayalew
(74) *Attorney, Agent, or Firm* — STAAS & HALSEY LLP

(57) ABSTRACT

A washing machine including a cabinet forming an exterior of the washing machine; a drum inside the cabinet; a living creature sensor configured to produce a detection signal, through a millimeter-wave (mmWave) radar, indicating whether a living creature exists inside the drum; a communication interface configured to communicate with an external device. The washing machine includes at least one processor configured to, based on a request to activate a remote control mode of the washing machine received from the external device through the communication interface, activate the living creature sensor, and, based on the detection signal produced by the activated living creature sensor, transmit, to the external device through the communication interface, information about whether a living creature exists inside the drum.

18 Claims, 19 Drawing Sheets

(51) Int. Cl.
  *D06F 33/30*    (2020.01)
  *D06F 34/20*    (2020.01)
  *D06F 37/26*    (2006.01)
  *D06F 39/14*    (2006.01)
  *D06F 103/40*   (2020.01)
  *D06F 105/50*   (2020.01)
  *D06F 105/58*   (2020.01)

(52) U.S. Cl.
  CPC ............ *D06F 37/266* (2013.01); *D06F 39/14* (2013.01); *D06F 2103/40* (2020.02); *D06F 2105/50* (2020.02); *D06F 2105/58* (2020.02)

(58) Field of Classification Search
  CPC ............ D06F 2105/50; D06F 2103/40; D06F 2105/58
  USPC ........................................................ 68/12.01
  See application file for complete search history.

(56) References Cited

U.S. PATENT DOCUMENTS

| | | |
|---|---|---|
| 2012/0000903 A1 | 1/2012 | Baarman et al. |
| 2016/0215430 A1 | 7/2016 | Ha et al. |
| 2016/0231422 A1 | 8/2016 | Zhou et al. |
| 2020/0087846 A1 | 3/2020 | Park et al. |
| 2020/0372782 A1 | 11/2020 | Yu et al. |

FOREIGN PATENT DOCUMENTS

| | | |
|---|---|---|
| CN | 114016260 A | 2/2022 |
| JP | 2016-536610 | 11/2016 |
| JP | 2017-6499 | 1/2017 |
| KR | 10-2007-0001614 | 1/2007 |
| KR | 10-2007-0073085 | 7/2007 |
| KR | 10-1243961 | 3/2013 |
| KR | 10-2013-0044764 | 5/2013 |
| KR | 10-2015-0027643 | 3/2015 |
| KR | 10-1656115 | 9/2016 |
| KR | 10-2020-0030771 | 3/2020 |
| KR | 10-2020-0134156 | 12/2020 |
| KR | 10-2284466 | 8/2021 |

OTHER PUBLICATIONS

KR102284466B1—machine translation (Year: 2021).*
International Search Report, PCT/ISA/210, dated Aug. 17, 2023, in PCT Application No. PCT/KR2023/006545.
Written Opinion, PCT/ISA/237, dated Aug. 17, 2023, in PCT Application No. PCT/KR2023/006545.

* cited by examiner

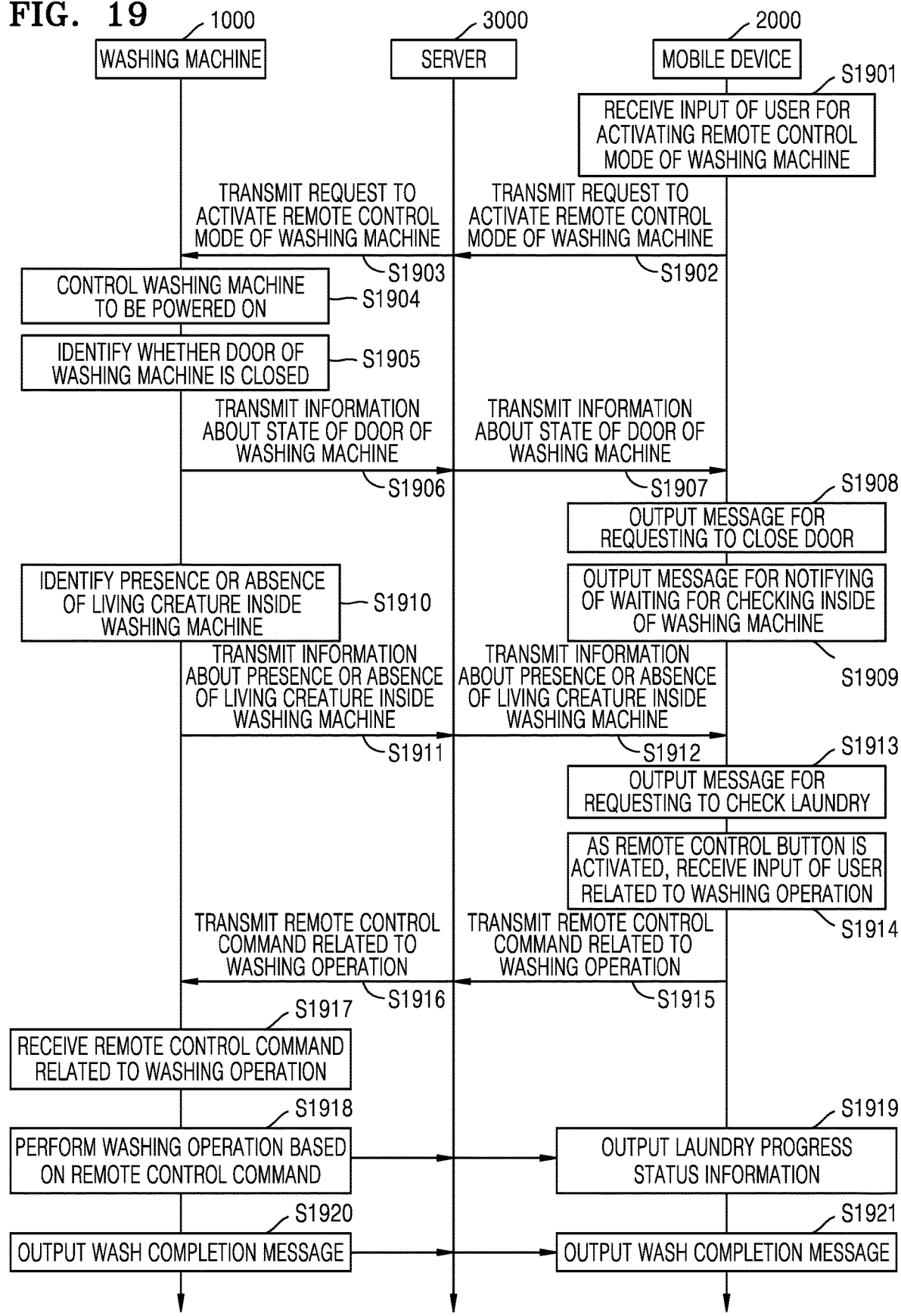

WASHING MACHINE AND METHOD OF CONTROLLING THE WASHING MACHINE

CROSS-REFERENCE TO RELATED APPLICATIONS

This application is a continuation application of International Application PCT/KR2023/006545, filed May 15, 2023, and claims foreign priority to Korean Application 10-2022-0088550, filed Jul. 18, 2022, and Korean Application 10-2022-0143019, filed Oct. 31, 2022. The disclosures of International Application PCT/KR2023/006545, Korean Application 10-2022-0088550, and Korean Application 10-2022-0143019 are incorporated herein by reference in their entireties.

TECHNICAL FIELD

An embodiment of the disclosure relates to a washing machine and a method of controlling the washing machine.

BACKGROUND ART

A washing machine is an apparatus capable of washing or drying laundry. The washing machine may perform an operation of washing laundry through a washing course including a washing cycle, a rinse cycle, a dehydration cycle, and/or a dry cycle.

In a case in which the washing machine is operated while a living creature such as a child or a pet is inside the washing machine, a safety accident may occur. Thus, washing machine safety standards (e.g., Korea Certification (KC), Korean Industrial Standards (KS), or International Electrotechnical Commission (IEC)) stipulate that a washing machine cannot be operated without checking the inside thereof. That is, there are restrictions on remote control of a washing machine for safety reasons.

Recently, there is an increasing demand for improving user convenience of a washing machine by allowing a user to go out while the washing machine is operating or to operate the washing machine considering the time of returning home.

DISCLOSURE

Technical Solution

According to an embodiment of the disclosure, a washing machine may include a cabinet forming an exterior of the washing machine; a drum inside the cabinet; a living creature sensor configured to produce a detection signal, through a millimeter-wave (mmWave) radar, indicating whether a living creature exists inside the drum; a communication interface configured to communicate with an external device; and at least one processor configured to, based on a request to activate a remote control mode of the washing machine received from the external device through the communication interface, activate the living creature sensor, and, based on the detection signal produced by the activated living creature sensor, transmit, to the external device through the communication interface, information about whether a living creature exists inside the drum.

According to an embodiment of the disclosure, the living creature sensor may be inclined at an angle from a horizontal direction and toward an inside of the drum.

According to an embodiment of the disclosure, the washing machine may include a housing including a plastic material, wherein the living creature sensor is inside the housing.

According to an embodiment of the disclosure, the washing machine may include a tub in the cabinet, and in which the drum is arranged; and a diaphragm between the tub and the cabinet, and including a through hole, wherein the living creature sensor is in the through hole of the diaphragm.

According to an embodiment of the disclosure, the washing machine may further include a light source module in the through hole of the diaphragm; and a printed circuit board, wherein the light source module and the living creature sensor are mounted on the printed circuit board.

According to an embodiment of the disclosure, based on the detection signal produced by the activated living creature sensor being greater than or equal to a threshold level, the information about whether a living creature exists inside the drum transmitted to the external device through the communication interface may indicate that a living creature exists inside the drum, and, based on the detection signal produced by the activated living creature sensor being less than the threshold level, the information about whether a living creature exists inside the drum transmitted to the external device through the communication interface may indicate that a living creature does not exist inside the drum.

According to an embodiment of the disclosure, the detection signal produced by the living creature sensor may be based on a distance value from the living creature sensor measured by the living creature sensor.

According to an embodiment of the disclosure, the at least one processor may be further configured to, based on the information about whether a living creature exists inside the drum transmitted to the external device through the communication interface indicating that a living creature does not exist inside the drum, receive, from the external device, a remote control command related to a washing operation of the washing machine.

According to an embodiment of the disclosure, the at least one processor may be further configured to, based on receiving the remote control command related to the washing operation of the washing machine, and a subsequent a detection signal produced by the activated living creature sensor, transmit, to the external device through the communication interface, information about whether a living creature exists inside the drum.

According to an embodiment of the disclosure, the at least one processor may be further configured to, based on the request to activate the remote control mode being received, control the washing machine to be powered on.

According to an embodiment of the disclosure, the washing machine may further include a door configured to open and close an inlet through which laundry is receivable into the drum; and a door sensor configured to detect whether the door is closed or opened, wherein the at least one processor may be further configured to, based on the washing machine being powered on, identify, through the door sensor, whether the door is closed, and, based on identifying that the door is closed, activate the living creature sensor.

According to an embodiment of the disclosure, the at least one processor may be further configured to, based on identifying that the door is opened based on an output signal of the door sensor, transmit, to the external device through the communication interface, information indicating that the door is opened.

According to an embodiment of the disclosure, the external device may include a server or a mobile device of a user connected through the server.

According to an embodiment of the disclosure, a method may control a washing machine that includes a cabinet forming an exterior of the washing machine, a drum inside the cabinet, a living creature sensor configured to produce a detection signal, through a millimeter-wave (mmWave) radar, indicating whether a living creature exists inside the drum, and a communication interface configured to communicate with an external device, and the method may include, based on a request to activate a remote control mode of the washing machine received from the external device through the communication interface, activating the living creature sensor, and, based on the detection signal produced by the activated living creature sensor, transmitting, to the external device through the communication interface, information about whether a living creature exists inside the drum.

According to an embodiment of the disclosure, based on the detection signal produced by the activated living creature sensor being greater than or equal to a threshold level, the information about whether a living creature exists inside the drum transmitted to the external device through the communication interface may indicate that a living creature exists inside the drum, and, based on the detection signal produced by the activated living creature sensor being less than the threshold level, the information about whether a living creature exists inside the drum transmitted to the external device through the communication interface may indicate that a living creature does not exist inside the drum.

According to an embodiment of the disclosure, the detection signal produced by the living creature sensor may be based on a distance value from the living creature sensor measured by the living creature sensor.

According to an embodiment of the disclosure, the method may further include, based on the information about whether a living creature exists inside the drum transmitted to the external device through the communication interface indicating that a living creature does not exist inside the drum, receiving, from the external device, a remote control command related to a washing operation of the washing machine.

According to an embodiment of the disclosure, the method may further include, based on receiving the remote control command related to the washing operation of the washing machine, and a subsequent a detection signal produced by the activated living creature sensor, transmitting, to the external device through the communication interface, information about whether a living creature exists inside the drum.

According to an embodiment of the disclosure, the method may further include, based on the request to activate the remote control mode being received, controlling the washing machine to be powered on.

According to an embodiment of the disclosure, the washing machine may include a door configured to open and close an inlet through which laundry is receivable into the drum, and a door sensor configured to detect whether the door is closed or opened, and the method may further include, based on the washing machine being powered on, identifying, through the door sensor, whether the door is closed, and, based on identifying that the door is closed, activating the living creature sensor.

DESCRIPTION OF DRAWINGS

FIG. 19 is a flowchart for describing a method of operating a washing machine in connection with a server and a mobile device, according to an embodiment of the disclosure.

MODE FOR INVENTION

Figure 1:
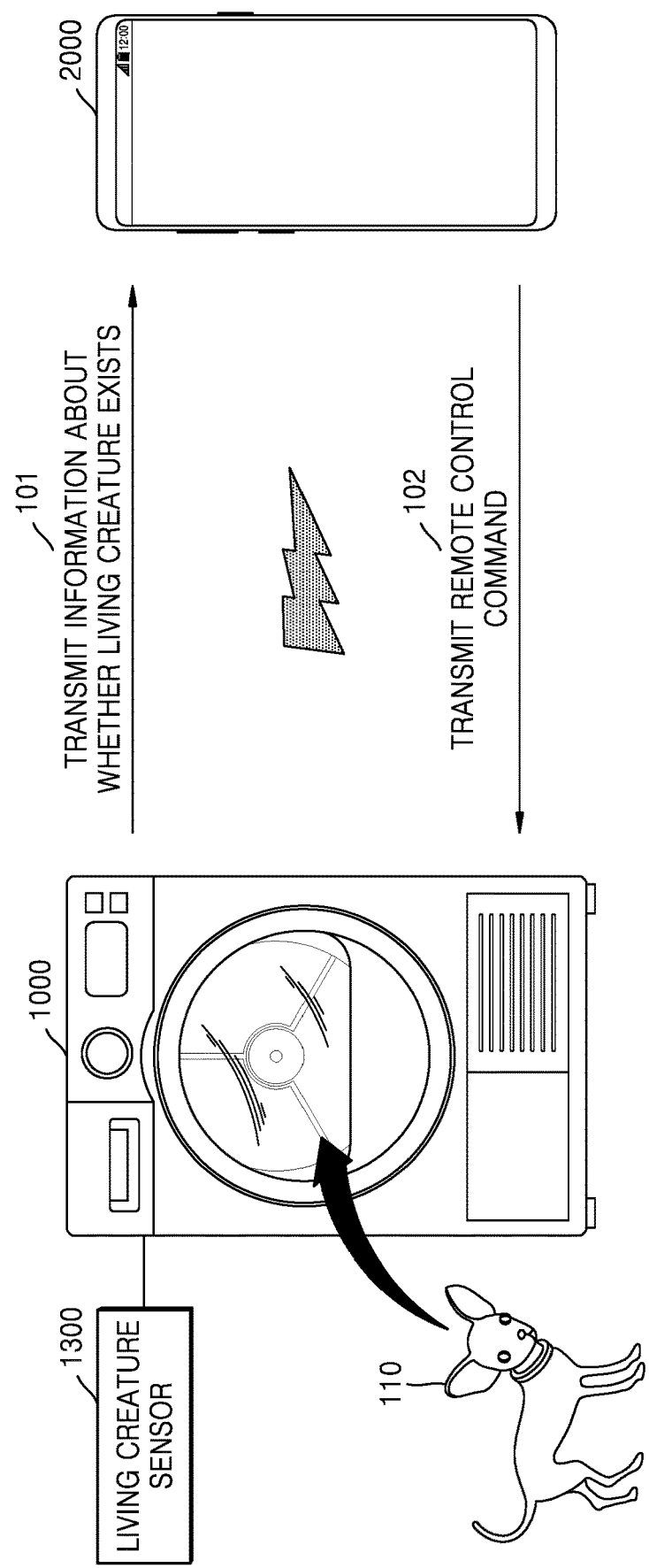
FIG. 1 is a diagram for describing an operation of a washing machine according to an embodiment of the disclosure.

Throughout the disclosure, the expression "at least one of a, b, or c" indicates only a, only b, only c, both a and b, both a and c, both b and c, all of a, b, and c, or variations thereof.

It should be appreciated that various embodiments of the disclosure and the terms used therein are not intended to limit the technological features set forth herein to particular embodiments of the disclosure, and include various changes, equivalents, or alternatives for a corresponding embodiment.

With regard to the description of the drawings, similar reference numerals may be used to refer to similar or related elements.

It is to be understood that a singular form of a noun corresponding to an item may include one or more of the things, unless the relevant context clearly indicates otherwise.

As used herein, the term "and/or" includes any one or a combination of a plurality of related recited elements.

As used herein, such terms as "1st" and "2nd," or "first" and "second" may be used to simply distinguish a corresponding component from another, and does not limit the components in other aspect (e.g., importance or order).

When an element (e.g., a first element) is referred to, with or without the term "operatively" or "communicatively", as being "coupled with," "coupled to," "connected with," or "connected to" another element (e.g., a second element), it means that the element may be connected to the other element directly (e.g., in a wired manner), wirelessly, or via a third element.

As used here, such terms as "comprises," "includes," or "has" specify the presence of stated features, numbers, stages, operations, components, parts, or a combination thereof, but do not preclude the presence or addition of one or more other features, numbers, stages, operations, components, parts, or a combination thereof.

When an element is referred to as being "connected to," "coupled to," "supported by," or "in contact with" another element, it means that the element is directly connected to, coupled to, supported by, or in contact with the other element, or that the element is indirectly connected to, coupled to, supported by, or in contact with the other element via a third element.

When an element is referred to as being "on" another element, it means that the element is in contact with the other element, or that still another element is present between the element and the other element.

Hereinafter, various embodiments of the disclosure and the operating principle thereof will be described with reference to the accompanying drawings.

FIG. 1 is a diagram for describing an operation of a washing machine according to an embodiment of the disclosure.

Referring to FIG. 1, a system for controlling a washing machine 1000 according to an embodiment of the disclosure may include the washing machine 1000 and a mobile device 2000. However, all of the illustrated components are not essential components. The system for controlling the washing machine 1000 may be implemented by more or fewer components than those illustrated in FIG. 1. For example, the system for controlling the washing machine 1000 may be implemented by the washing machine 1000, a server device (not shown), and the mobile device 2000.

The washing machine 1000 is an apparatus for automatically washing laundry by using electricity, and may perform washing, rinse, drain, and/or dehydration cycles. The washing machine 1000 may also perform a dry cycle on laundry on which dehydration has been completed. The washing machine 1000 may be an example of a laundry treatment apparatus. An embodiment of the disclosure are not limited to washing machines and may be applied to dryers, steam closets, shoe care apparatuses, and the like.

The washing machine 1000 according to an embodiment of the disclosure may identify, through a living creature sensor 1300, whether there is a living creature 110, such as a child or a pet inside, moving in the washing machine 1000. The washing machine 1000 according to an embodiment of the disclosure may receive, through the living creature sensor 1300, a detection signal regarding whether the living creature 110 exists inside the washing machine 1000. The washing machine 1000 may identify whether the living creature 110 exists inside the washing machine 1000, according to the detection signal received from the living creature sensor 1300.

The washing machine 1000 according to an embodiment of the disclosure may transmit and receive information to and from the mobile device 2000 through wireless communication. The mobile device 2000 may be a user device registered to a server with the same account as that of the washing machine 1000.

The mobile device 2000 according to an embodiment of the disclosure may be implemented in various forms. For example, the mobile device 2000 described in the disclosure may be, but is not limited to, a smart phone, a laptop computer, a tablet personal computer (PC), a digital camera, an electronic book terminal, a digital broadcast terminal, a personal digital assistant (PDA), a portable multimedia player (PMP), a navigation system, an MP3 player, or the like. For example, the mobile device 2000 may include a wearable device that may be worn by a user. Hereinafter, for convenience of description, an example is described in which the mobile device 2000 is a smart phone.

The washing machine 1000 according to an embodiment of the disclosure may transmit, to the mobile device 2000, a result of identifying whether the living creature 110 exists inside the washing machine 1000 (101). For example, based on identifying, through the living creature sensor 1300, that the living creature 110 does not exist inside the washing machine 1000, the washing machine 1000 may transmit information about the absence of living creature to the mobile device 2000. For example, based on identifying, through the living creature sensor 1300, that the living creature 110 exists inside the washing machine 1000, the washing machine 1000 may transmit information about the presence of living creature to the mobile device 2000.

The mobile device 2000 according to an embodiment of the disclosure may transmit information to the washing machine 1000 through wireless communication. The mobile device 2000 may transmit a remote control command to the washing machine 1000, based on receiving information about whether the living creature 110 exists inside the washing machine 1000 (102). For example, when the mobile device 2000 receives the information about the absence of living creature from the washing machine 1000, the mobile device 2000 may activate a remote control button for the washing machine 1000 and receive, from the user, a remote control input related to the washing machine 1000. The mobile device 2000 may transmit, to the washing machine 1000, a remote control command corresponding to the remote control input of the user. Based on receiving the remote control command, the washing machine 1000 may perform a washing operation corresponding to the remote control command.

However, for example, based on identifying that a living creature exists inside the washing machine 1000, the washing machine 1000 may restrict remote control by the mobile device 2000. For example, when the mobile device 2000 receives the information about the presence of living creature from the washing machine 1000, the mobile device

2000 may not activate the remote control button for the washing machine 1000. This is to prevent danger that may occur when the washing machine 1000 is remotely controlled even though the living creature 110 exists inside the washing machine 1000. In this case, the mobile device 2000 may output a message indicating that the living creature 110 inside the washing machine 1000 has been detected.

According to an embodiment of the disclosure, the washing machine 1000 may be remotely controlled through the mobile device 2000. The washing machine 1000 may identify, through the living creature sensor 1300, whether the living creature 110 exists inside the washing machine 1000, and only in a case in which the living creature 110 does not exist inside the washing machine 1000, receive the remote control command from the mobile device 2000. Accordingly, the washing machine 1000 may perform the washing operation in a state in which the inside of the washing machine 1000 is checked, and thus satisfy safety standards for the washing machine 1000.

In addition, the washing machine 1000 may be remotely controlled, the user may go out while the washing machine 1000 is operating. Also, the user may remotely operate the washing machine 1000 considering the time of returning home. Accordingly, user convenience in using the washing machine 1000 may be improved.

Figure 2:
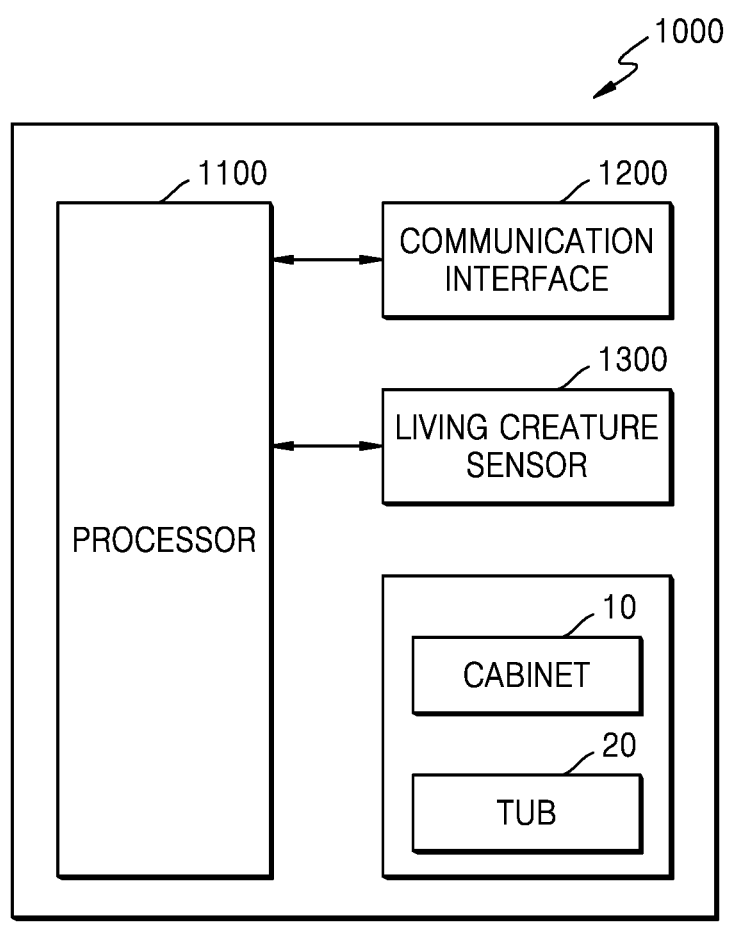
FIG. 2 is a block diagram of a washing machine according to an embodiment of the disclosure.

FIG. 2 is a block diagram of a washing machine according to an embodiment of the disclosure.

Referring to FIG. 2, the washing machine 1000 according to an embodiment of the disclosure may include a processor 1100, a communication interface 1200, and the living creature sensor 1300. In addition, the washing machine 1000 according to an embodiment of the disclosure may further include a cabinet 10 and a tub 20. However, all of the components illustrated in FIG. 2 are not essential components. The washing machine 1000 may be implemented by more or fewer components than those illustrated in FIG. 2.

The cabinet 10 may form the exterior of the washing machine 1000. The cabinet 10 may be a box-shaped container composed of panels or frames. An inlet for putting in laundry may be formed on the front side of the washing machine 1000. The tub 20 for accommodating wash water may be formed inside the cabinet 10. The tub 20 may be composed of a cylindrical container and may be installed in the cabinet 10 such that one open entrance of the tub 20 is connected to the inlet. In addition, the processor 1100, the communication interface 1200, and the living creature sensor 1300 may be formed inside the cabinet 10.

The processor 1100 controls the overall operation of the washing machine 1000. For example, the processor 1100 may control the communication interface 1200 and the living creature sensor 1300. The processor 1100 may control the communication interface 1200 to transmit or receive a certain signal. The processor 1100 may activate or deactivate the living creature sensor 1300. The washing machine 1000 may include at least one processor. The processor 1100 may be one of the at least one processor. The at least one processor according to the disclosure may include at least one of a central processing unit (CPU), a graphics processing unit (GPU), an accelerated processing unit (APU), a many-integrated core (MIC) processor, a digital signal processor (DSP), or a neural processing unit (NPU). The at least one processor may be implemented in the form of an integrated system on a chip (SoC) including one or more electronic components. Each of the at least one processor may be implemented as separate hardware (H/W). The at least one processor may be referred to as a microprocessor controller (MICOM), a microprocessor unit (MPU), or a microcontroller unit (MCU).

The at least one processor according to the disclosure may be implemented as a single-core processor or a multi-core processor.

The processor 1100 according to an embodiment of the disclosure may receive a request to activate a remote control mode of the washing machine 1000, from an external device through the communication interface 1200. The processor 1100 may activate the living creature sensor 1300 in response to the request. The processor 1100 may receive, from the living creature sensor 1300, a detection signal regarding the presence or absence of a living creature inside the washing machine 1000. Based on the received detection signal, the processor 1100 may transmit information about whether a living creature exists inside the washing machine 1000, to the external device through the communication interface 1200.

The communication interface 1200 may include one or more components configured to enable communication between the washing machine 1000 and an external device (not shown). The external device may include a server (not shown) or a mobile device (not shown) of a user connected through a server. For example, the communication interface 1200 may include a short-range communication unit (e.g., a near-field communication (NFC) communication unit, a Bluetooth communication unit, a Bluetooth Low Energy (BLE) communication unit or the like), a long-range communication unit, and the like. In an embodiment of the disclosure, the communication interface 1200 may wirelessly communicate with an external device.

The washing machine 1000 according to an embodiment of the disclosure may identify, through the living creature sensor 1300, whether a living creature exists inside the washing machine 1000, and only in a case in which no living creature exists inside the washing machine 1000, receive a remote control command through the communication interface 1200. The washing machine 1000 according to an embodiment of the disclosure may perform a washing operation according to the remote control command received through wireless communication, while complying with the safety standards, thereby improving user convenience.

Figure 3:
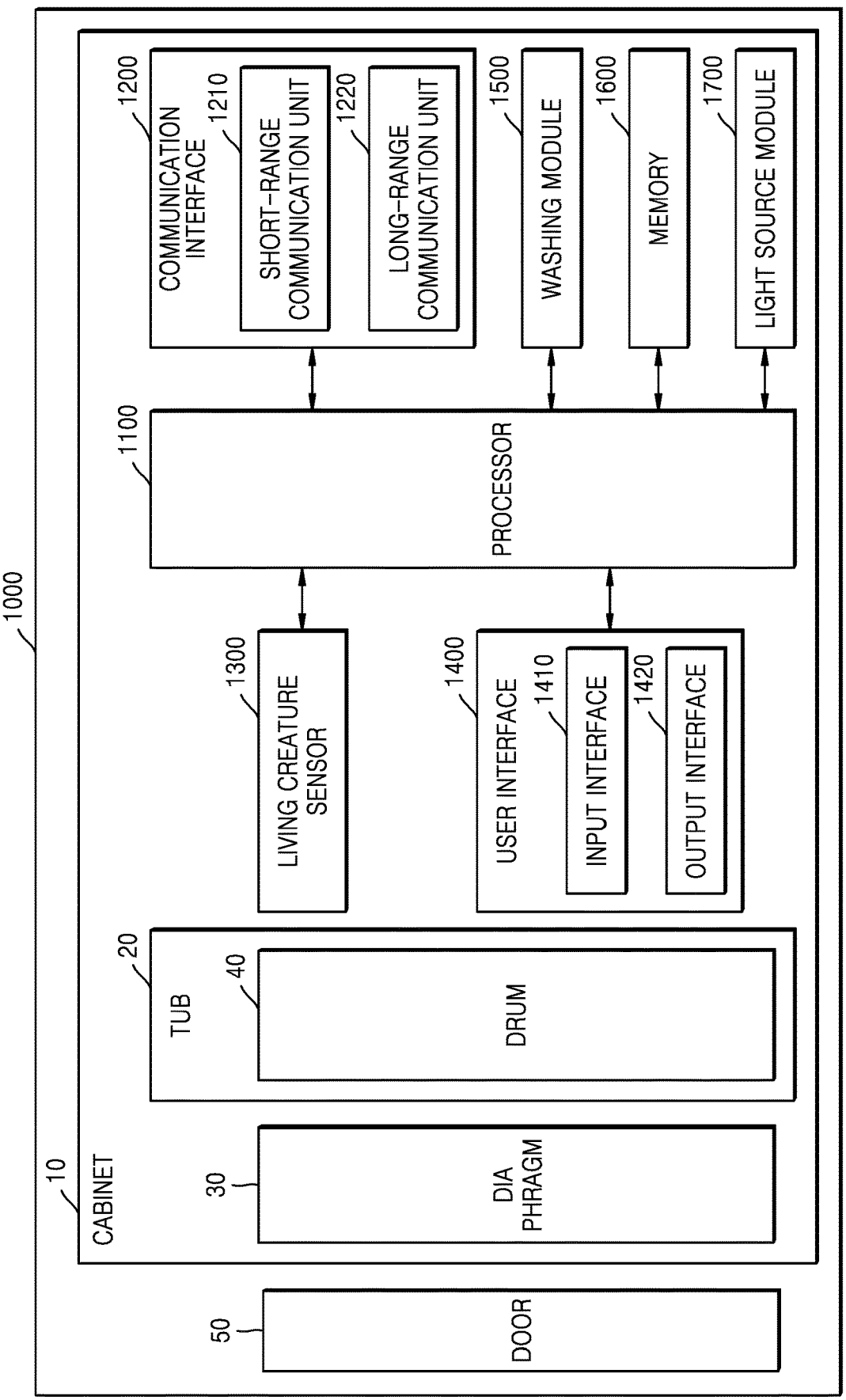
FIG. 3 is a detailed block diagram of a washing machine according to an embodiment of the disclosure.

FIG. 3 is a detailed block diagram of a washing machine according to an embodiment of the disclosure.

Referring to FIG. 3, the washing machine 1000 according to an embodiment of the disclosure may include the cabinet 10 forming the exterior of the washing machine 1000, the tub 20 provided inside the cabinet 10, a diaphragm 30, and a drum 40. In addition, the washing machine 1000 may include the processor 1100, the communication interface 1200, the living creature sensor 1300, a user interface 1400, a washing module 1500, a memory 1600, and a light source module 1700, which are provided inside the cabinet 10.

The washing machine 1000 may include a top-loading washing machine in which an inlet for putting in or taking out laundry is provided at the top, or a front-loading washing machine in which an inlet for putting in or taking out laundry is provided at the front. The washing machine 1000 may include a washing machine of a loading type other than top-loading washing machines and front loading washing machines.

A top-loading washing machine may wash laundry by using a water current generated by a rotating body such as a pulsator. A front-loading washing machine may wash laundry by rotating a drum to repeatedly raise and fall the laundry. The front-loading washing machine may include a lift for raising laundry. The washing machine 1000 may include a washing machine using a washing method other than the above-described washing methods. In the disclosure, the washing machine 1000 is illustrated as a front-loading washing machine, but is not limited thereto.

The cabinet 10 may have a shape in which a portion is open. An inlet may be provided on the front of the cabinet 10 to input laundry into the drum 40. The inlet is opened and closed by a door 50. The door 50 may be rotatably mounted on the cabinet 10 by a hinge. At least one portion of the door 50 may be transparent or translucent such that the interior of the cabinet 10 is visible.

In an embodiment of the disclosure, the door 50 may have an inclined surface to minimize glass interference with the living creature sensor 1300, which will be described below in FIG. 5.

In a case in which the washing machine 1000 is a top-loading washing machine, the inlet may be provided at the top of the cabinet 10. In a case in which the washing machine 1000 is a front-loading washing machine, the inlet may be provided at the front of the cabinet 10.

The tub 20 and the drum 40 rotatably arranged inside the tub 20 may be provided inside the cabinet 10. The drum 40 accommodates the laundry that is input through the inlet and provides a space for washing the laundry.

The tub 20 may be provided inside the cabinet 10 to store wash water. The tub 20 may have a substantially cylindrical shape with one open side. The open side of the tub 20 may be connected to the inlet.

The tub 20 is connected to the cabinet 10 by the diaphragm 30 and may be supported inside the cabinet 10. The tub 20 may be elastically supported from the cabinet 10 by the diaphragm 30.

The diaphragm 30 is installed between the tub 20 and the cabinet 10 and may be formed in a substantially annular shape. One end of the diaphragm 30 may be fixed to the open side of the tub 20, and the other end of the diaphragm 30 may be fixed to the inner circumference of the inlet on the front side of the cabinet 10. The diaphragm 30 prevents the wash water accommodated in the tub 20 from leaking out of the tub 20, and forms a passage through which the laundry passes. In addition, the diaphragm 30 may block transmission of vibration generated when the drum 40 rotates, to the front of the cabinet 10 through the tub 20. The diaphragm 30 may be formed of rubber to absorb vibration energy, between the tub 20 and the cabinet 10 to damp vibration.

In an embodiment of the disclosure, the diaphragm 30 may include a through hole, and the living creature sensor 1300 may be positioned inside the through hole. The light source module 1700 may be positioned inside the through hole. This will be described below with reference to FIG. 4.

The drum 40 may be provided to accommodate laundry. The drum 40 may perform washing, rinse, and/or dehydration cycles while rotating inside the tub 20. The drum 40 may include a through hole connecting the inner space of the drum 40 to the inner space of the tub 20. The drum 40 may have a substantially cylindrical shape with one open side.

In an embodiment of the disclosure, the living creature sensor 1300 of the washing machine 1000 may detect whether a living creature exists inside the drum 40.

The washing module 1500 may include a driving module. The driving module may be configured to rotate the drum 40. The driving module may include a drive motor and may transmit a driving force generated by the driving motor to the drum 40. The driving module may be provided to perform washing, rinse, and/or dehydration cycles by rotating the drum 40 forward or backward.

The washing module 1500 may further include a water supply module configured to supply wash water to the tub 20, a detergent supply module configured to supply a detergent to the tub 20, a discharge module configured to discharge the wash water accommodated in the tub 20 to the outside, and a power module connected to a power source and configured to supply power to the components of the washing machine 1000.

The processor 1100 controls the overall operation of the washing machine 1000. The processor 1100 may execute programs stored in the memory 1600 to control the components of the washing machine 1000. The processor 1100 may include a separate NPU configured to perform an operation of an artificial intelligence model. Also, the processor 1100 may include a CPU, a GPU, and the like. The processor 1100 according to an embodiment of the disclosure may include a main processor and a sub-processor operating in a low-power mode.

The processor 1100 according to an embodiment of the disclosure may receive a request to activate the remote control mode of the washing machine 1000, from an external device through the communication interface 1200. The processor 1100 may activate the living creature sensor 1300 in response to the request. The processor 1100 may receive, from the living creature sensor 1300, a detection signal regarding the presence or absence of a living creature inside the washing machine 1000. Based on the received detection signal, the processor 1100 may transmit information about whether a living creature exists inside the washing machine 1000, to the external device through the communication interface 1200.

The processor 1100 according to an embodiment of the disclosure may, based on the detection signal received from the living creature sensor 1300 being greater than or equal to a threshold level, transmit, to an external device, information about the presence of a living creature inside the washing machine 1000, and based on the detection signal received from the living creature sensor 1300 being less than the threshold level, transmit, to the external device, information about the absence of a living creature inside the washing machine 1000.

The processor 1100 according to an embodiment of the disclosure may transmit, to the external device, information about whether a living creature exists inside the washing machine 1000, based on a distance value between the living creature and the living creature sensor 1300 received from the living creature sensor 1300.

The processor 1100 according to an embodiment of the disclosure may receive, from the external device, a remote control command related to a washing operation, as the information about the absence of a living creature inside the washing machine 1000 is transmitted to the external device.

As the processor 1100 according to an embodiment of the disclosure receives the remote control command related to the washing operation, the processor 1100 may receive again, from the living creature sensor 1300, a detection signal regarding the presence or absence of a living creature inside the washing machine 1000, based on the received detection signal, transmit, to the external device, information about the presence or absence of a living creature inside the washing machine 1000, and perform the washing operation corresponding to the remote control command.

Based on receiving a request to activate the remote control mode of the washing machine 1000, the processor 1100 according to an embodiment of the disclosure may control the washing machine 1000 to be powered on.

As the washing machine 1000 is powered on, the processor 1100 according to an embodiment of the disclosure may identify, through a door sensor (not shown), whether the door 50 is closed, and based on determining that the door 50 is closed, activate the living creature sensor 1300.

Based on determining that the door 50 is opened based on an output signal of the door sensor, the processor 1100 according to an embodiment of the disclosure may transmit information indicating that the door 50 is opened, to the external device through the communication interface 1200. Based on determining that the door 50 is opened, the processor 1100 may not activate the living creature sensor 1300.

The communication interface 1200 may include at least one of a short-range communication unit 1210 or a long-range communication unit 1220. The communication interface 1200 may include at least one antenna for wirelessly communicating with an external device. The short-range communication unit 1210 may include, but is not limited to, a Bluetooth communication module, a BLE communication module, an NFC module, a wireless local area network (WLAN) (e.g., Wi-Fi) communication module, a Zigbee communication module, an Infrared Data Association (IrDA) communication module, a Wi-Fi Direct (WFD) communication module, an ultra-wideband (UWB) communication module, an Ant+ communication module, a microwave (uWave) communication module, and the like. The long-range communication unit 1220 may include a communication module configured to perform various types of long-range communication. The remote communication unit 1220 may transmit and receive wireless signals to and from an external device.

The communication interface 1200 may communicate with external devices such as servers, mobile devices, or other home appliances, through a peripheral access point (AP). The AP may connect a LAN to which the washing machine 1000 or a user device is connected, to a wide area network (WAN) to which a server is connected. The washing machine 1000 or the user device may be connected to the server through the WAN. In a case in which the external device is the mobile device 2000, the washing machine 1000 may transmit state information of the washing machine 1000 to the mobile device 2000 through the communication interface 1200 to inform the user holding the mobile device 2000 of the state of the washing machine 1000 or provide the user with information related to a washing operation. In addition, the washing machine 1000 may control the operation of the washing machine 1000, based on a remote control command received through the communication interface 1200.

The user interface 1400 may include an input interface 1410 and an output interface 1420. The input interface 1410 may receive an input from the user and deliver the input to the processor 1100. The input interface 1410 may include buttons related to the washing machine 1000, for example, a power button, a washing machine operation button, a course selection dial (or a course selection button), or a washing/rinse/dehydration setting button. The output interface 1420 may output various pieces of information related to the operation of the washing machine 1000. The output interface 1420 includes a display, a light-emitting diode (LED), a speaker, or the like. For example, the output interface 1420 may output, through the display, washing course information and operation time information.

The living creature sensor 1300 may be positioned inside the washing machine 1000, and may detect whether a living creature exists inside the washing machine 1000. The living creature sensor 1300 may detect the presence of a living creature by detecting a movement of the living creature or recognizing the distance to the living creature.

In an embodiment of the disclosure, the living creature sensor 1300 may include a millimeter-wave (mmWave) radar. In general, a radar sensor may detect the presence of an object, the distance to the object, and the speed and direction of the object, by transmitting electromagnetic waves through transmit and receive antennas, and analyzing the electromagnetic waves reflected from the object.

In an embodiment of the disclosure, the millimeter-wave radar may measure a movement of an object in units of millimeters (mm) as it receives a signal by using a wavelength within a range of millimeters (mm). The millimeter-wave radar may operate in a spectrum of 30 GHz to 300 GHz. The millimeter-wave radar uses short wavelengths, and thus provides sub-millimeter range accuracy, and the short wavelengths may pass through such materials as plastic, a drywall, or clothes. In addition, the millimeter-wave radar may be less affected by environmental conditions such as rain, fog, dust, or snow.

The living creature sensor 1300 according to an embodiment of the disclosure may detect, through the millimeter-wave radar, a minute movement of a living creature existing inside the washing machine 1000, such as respiration or heartbeat. The living creature sensor 1300 may measure a sensing value according to a movement of a living creature (e.g., respiration or heartbeat). In addition, the living creature sensor 1300 may measure, through the millimeter-wave radar, a distance value between the living creature existing inside the washing machine 1000 and the living creature sensor 1300. In addition, the living creature sensor 1300 may measure the direction of the living creature, the position of the living creature, and the like.

The living creature sensor 1300 according to an embodiment of the disclosure may minimize an error rate of the living creature sensor 1300 as the number of measurement factors increases. For example, the living creature sensor 1300 may measure the sensing value according to the movement of the living creature, and output, to the processor 1100, a detection signal corresponding to the sensing value. For example, the living creature sensor 1300 may measure a sensing value according to a movement of the living creature and a distance value of the living creature, and output, to the processor 1100, a detection signal regarding the presence or absence of a living creature, through the two measurement factors.

In an embodiment of the disclosure, the living creature sensor 1300 may transmit, to the processor 1100, a detection signal regarding the presence or absence of a living creature, based on a sensing value according to a movement of the living creature. The processor 1100 may determine the presence or absence of a living creature inside the washing machine 1000, based on the detection signal received from the living creature sensor 1300. For example, the living creature sensor 1300 may measure a sensing value according to a movement of the living creature, and compare the measured sensing value with a threshold level. For example, based on the sensing value being greater than or equal to the threshold level, the living creature sensor 1300 may determine that a living creature exists, and transmit, to the processor 1100, a detection signal of '1' or 'high level' or a detection signal of '0' or 'low level'. Based on receiving the detection signal of '1' or 'high level', the processor 1100 may determine that a living creature exists inside the washing machine 1000. In addition, based on the sensing value being less than the threshold level, the living creature sensor 1300 may determine that no living creature exists, and transmit, to the processor 1100, a detection signal of '0' or 'low level'. Based on receiving the detection signal of '0' or 'low level', the processor 1100 may determine that no living creature exists inside the washing machine 1000.

Meanwhile, although it is described herein that, based on the sensing value being greater than or equal to the threshold level, the living creature sensor 1300 transmits, to the processor 1100, a detection signal of '1' or 'high level', and based on the sensing value being less than the threshold level, the living creature sensor 1300 transmits, to the processor 1100, a detection signal of '0' or 'low level', the disclosure is not limited thereto. For example, based on the sensing value being greater than or equal to the threshold level, the living creature sensor 1300 may transmit, to the processor 1100, a detection signal of '0' or 'low level', and based on the sensing value being less than the threshold level, the living creature sensor 1300 may transmit, to the processor 1100, a detection signal of '1' or 'high level'. The living creature sensor 1300 according to an embodiment of the disclosure may include at least one processor.

However, the disclosure is not limited thereto, and in an embodiment of the disclosure, the living creature sensor 1300 may transmit, to the processor 1100, a detection signal including the sensing value according to the movement of a living creature. The processor 1100 may determine the presence or absence of a living creature, according to the received detection signal. For example, the processor 1100 may compare the detection signal received from the living creature sensor 1300, with the threshold level. For example, based on the detection signal being greater than or equal to the threshold level, the processor 1100 of the washing machine 1000 may determine that a living creature exists. Also, based on the detection signal being less than the threshold level, the processor 1100 may determine that no living creature exists.

The living creature sensor 1300 according to an embodiment of the disclosure may transmit a signal to the processor 1100 through a communication interface. The communication interface may include, for example, a serial peripheral interface (SPI) or a universal asynchronous receiver/transmitter (UART), but is not limited thereto. The living creature sensor 1300 may be connected to the communication interface 1200 of the washing machine 1000 through the communication interface.

The memory 1600 stores or records various pieces of information, data, instructions, programs, and the like necessary for the operation of the washing machine 1000. The memory 1600 may store temporary data (e.g., a washing course, wash options, etc.) generated when generating a control signal for controlling the components included in the washing machine 1000. The memory 1600 may include at least one of volatile memory or non-volatile memory, or a combination thereof.

The light source module 1700 may be a light source to brighten the inside of the washing machine 1000, in particular, the inside of the drum 40. The light source module 1700 may include an LED, but is not limited thereto. The light source module 1700 may be mounted at a fixed position such as the cabinet 10 or the door 50, as long as it is a position suitable for irradiating the inside of the drum 40 with light. However, in a case in which the light source module 1700 is mounted at the fixed position, vibration generated by the tub 20 may be transmitted to the fixed position to damage the light source module 1700, and thus, the light source module 1700 may be mounted on the tub 20, or, in particular, the diaphragm 30 that is able to dampen vibration.

Figure 4:
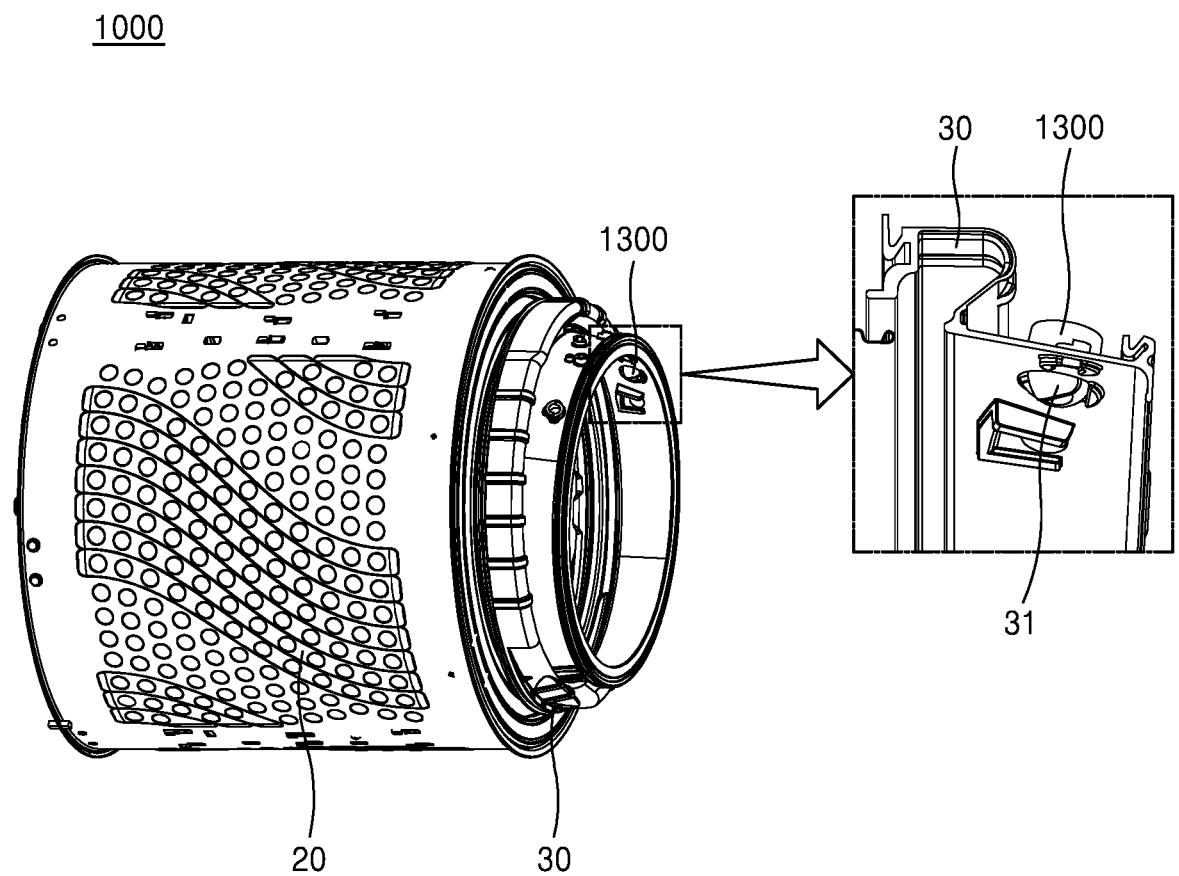
FIG. 4 is a perspective view of an internal structure of a washing machine according to an embodiment of the disclosure.

FIG. 4 is a perspective view of an internal structure of a washing machine according to an embodiment of the disclosure.

FIG. 4 illustrates an internal structure of a cabinet of the washing machine 1000 according to an embodiment of the disclosure. For example, the washing machine 1000 may include the tub 20 and the diaphragm 30 formed on one open side of the tub 20. The tub 20 has a cylindrical shape with one open side, and the open side may be connected to the inlet. The diaphragm 30 may have an annular shape, and may form a passage through which laundry from the inlet passes.

The diaphragm 30 according to an embodiment of the disclosure may include a through hole 31 formed to penetrate the diaphragm 30. The through hole 31 may be formed on one side of the diaphragm 30. For example, the through hole 31 may be formed on any one of the upper side, lower side, left side, and right side of the diaphragm 30. In the disclosure, the through hole 31 is illustrated as being formed on the upper side of the diaphragm 30, but is not limited thereto.

In an embodiment of the disclosure, the living creature sensor 1300 may be positioned inside the through hole 31 of the diaphragm 30. The living creature sensor 1300 may be formed to penetrate the diaphragm 30. The living creature sensor 1300 may be formed on any one of the upper side, lower side, left side, and right side according to the position of the through hole 31, and in the disclosure, the living creature sensor 1300 is described as being formed on the upper side of the diaphragm 30.

The living creature sensor 1300 according to an embodiment of the disclosure may be connected to the processor 1100 of the washing machine 1000 through a wire, but is not limited thereto.

Meanwhile, in a case in which the washing machine 1000 according to an embodiment of the disclosure further includes the light source module 1700, the living creature sensor 1300 and the light source module 1700 may be formed at separate positions. For example, the living creature sensor 1300 and the light source module 1700 may be positioned in parallel on the upper side of the diaphragm 30. For example, the light source module 1700 may be positioned on the upper side of the washing machine 1000, and the living creature sensor 1300 may be positioned on the lower side of the washing machine 1000.

Figure 5:
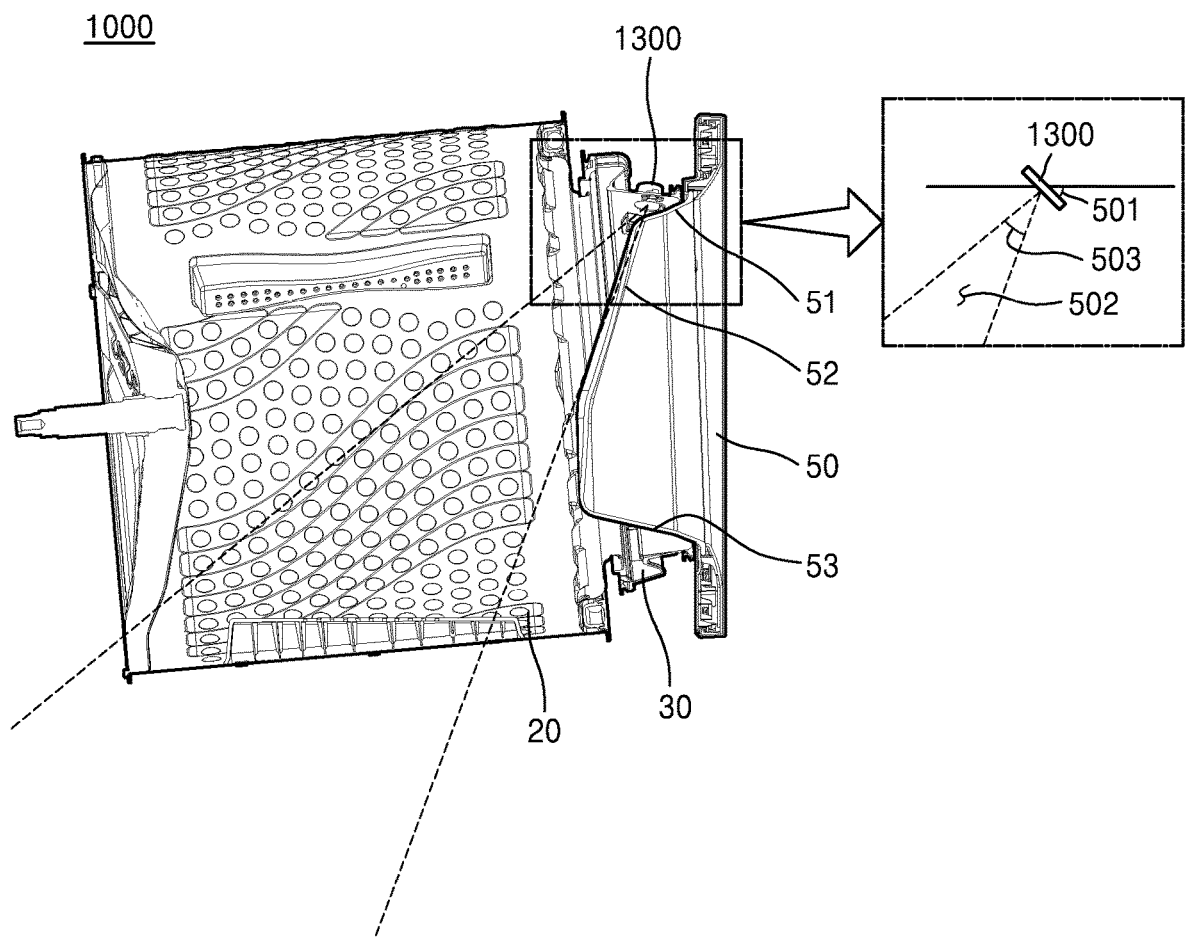
FIG. 5 is a cross-sectional view of an internal structure of a washing machine according to an embodiment of the disclosure.

FIG. 5 is a cross-sectional view of an internal structure of a washing machine according to an embodiment of the disclosure.

FIG. 5 illustrates the tub 20, the diaphragm 30, the door 50, and the living creature sensor 1300 of the washing machine 1000 according to an embodiment of the disclosure. For example, the door 50 may be positioned on one open side of the tub 20, and formed to open and close the inlet.

In an embodiment of the disclosure, the living creature sensor 1300 may detect a movement of a living creature existing within a detection area 502. The living creature sensor 1300 may have an angle of view 503. The area of the detection area 502 may be determined according to the angle of view 503 of the living creature sensor 1300.

For example, the living creature sensor 1300 may have a preset angle of view to entirely detect the inside of the washing machine 1000. For example, assuming that the width of the inside of the washing machine 1000 is about 1 m, the living creature sensor 1300 may have a horizontal angle of view of 30 degrees or greater and a vertical angle of view of 20 degrees or greater. The living creature sensor 1300 having a high angle of view may detect the bottom surface (e.g., a part where a living creature is often located) and side surfaces of the inside of the washing machine 1000. The living creature sensor 1300 having a low angle of view is unable to detect a movement of a living creature at an outer portion of the bottom surface of the inside of the washing machine 1000. Therefore, the angle of view of the living creature sensor 1300 needs to be appropriately adjusted considering the width of the inside of the washing machine 1000. In the disclosure, the living creature sensor 1300 may have a horizontal angle of view of 80 degrees or greater and a vertical angle of view of 40 degrees or greater.

In an embodiment of the disclosure, the living creature sensor 1300 may be arranged inclined at a first angle 501. As the living creature sensor 1300 is arranged inclined at the first angle 501, the detection area 502 faces the inside of the washing machine 1000. For example, the first angle 501 may be 30 degrees or greater, but is not limited thereto.

In an embodiment of the disclosure, as the living creature sensor 1300 is arranged inclined at the first angle 501, glass interference by the door 50 may be minimized. In a case in which the living creature sensor 1300 includes a millimeter-wave radar, electromagnetic waves from the millimeter-wave radar may be interfered with due to the refractive index of glass. Thus, in a case in which a part of the detection area 502 of the living creature sensor 1300 overlaps the door 50, the electromagnetic waves in the detection area 502 may be weakened. Accordingly, the living creature sensor 1300 may be arranged inclined at the first angle 501 considering the door 50.

Meanwhile, in an embodiment of the disclosure, the door 50 may protrude into the tub 20 (or a drum) of the washing machine 1000. As the door 50 protrudes inward, the door 50 may have first inclined surfaces 51 and 53 having a first angle of inclination, and a second inclined surface 52 having a second angle of inclination. The second angle of inclination may be steeper than the first angle of inclination. The first inclined surface 51 may be positioned on the upper side of the washing machine 1000, and the first inclined surface 53 may be positioned on the lower side of the washing machine 1000.

In an embodiment of the disclosure, the second inclined surface 52 of the door 50 may be positioned between the first inclined surfaces 51 and 53, and the depth of the protrusion of the door 50 may decrease toward the living creature sensor 1300. The second inclined surface 52 of the door 50 may be formed considering the detection area 502 of the living creature sensor 1300. That is, the second inclined surface 52 may be formed to be steeper than the first inclined surfaces 51 and 53 in order to minimize the contact area between the door 50 and the detection area 502 of the living creature sensor 1300.

For example, in a case in which the living creature sensor 1300 is positioned on the upper side of the washing machine 1000, the door 50 may include the second inclined surface 52 formed by more steeply cutting a part of the first inclined surface 51 positioned on the upper side. Accordingly, the contact area between the door 50 and the detection area 502 of the living creature sensor 1300 may be minimized.

The disclosure is not limited thereto, and for example, in a case in which the living creature sensor 1300 is positioned on the lower side of the washing machine 1000, the door 50 may include the second inclined surface 52 formed by more steeply cutting a part of the first inclined surface 53 positioned on the lower side. Accordingly, the contact area between the door 50 and the detection area 502 of the living creature sensor 1300 may be minimized.

Meanwhile, in an embodiment of the disclosure, the living creature sensor 1300 may be mounted at a position of the door 50 or the tub 20 that is suitable for detecting the inside of the washing machine 1000. In a case in which the living creature sensor 1300 is designed to be mounted on the door 50, it is necessary to minimize the possibility that the living creature sensor 1300 is damaged by vibration generated when the drum rotates. In addition, in a case in which the living creature sensor 1300 is designed to be mounted on the tub 20, it is necessary to design a housing capable of waterproofing the living creature sensor 1300 in order to prevent penetration of wash water.

In an embodiment of the disclosure, as the living creature sensor 1300 is mounted on the diaphragm 30, vibration of the tub 20 may be dampened, penetration of wash water may be prevented, and thus, damage to the living creature sensor 1300 may be minimized.

Figure 6:
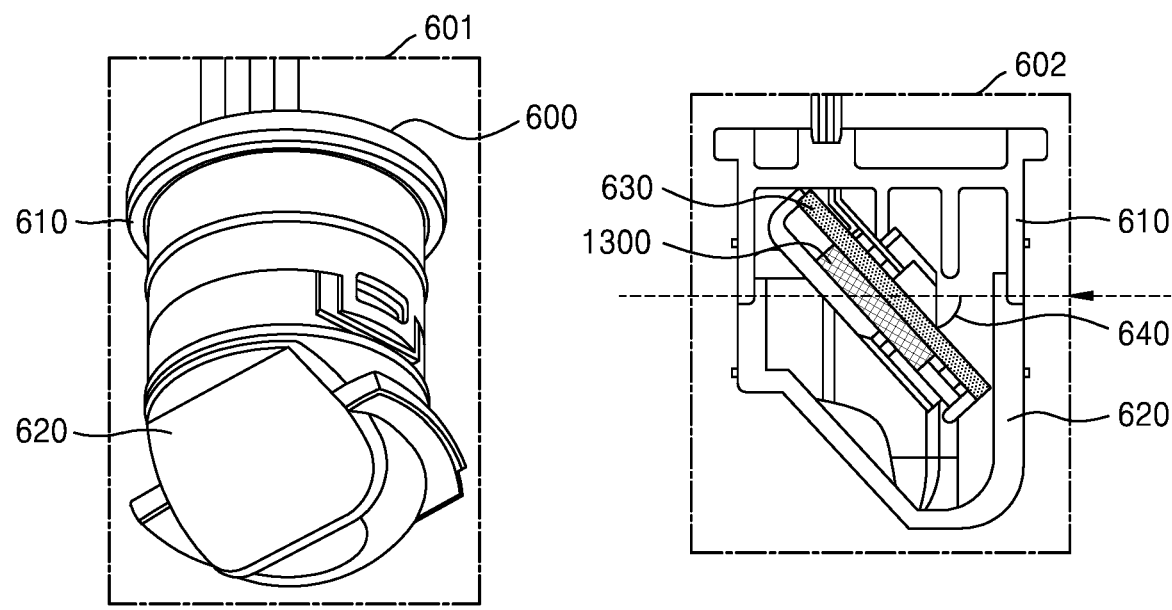
FIG. 6 is a perspective view and a cross-sectional view of a living creature sensor according to an embodiment of the disclosure.

FIG. 6 is a perspective view and a cross-sectional view of a living creature sensor according to an embodiment of the disclosure.

In an embodiment of the disclosure, the living creature sensor 1300 may be formed inside a housing 600. In FIG. 6, a perspective view of the housing 600 is illustrated in 601, and a cross-sectional view of the housing 600 is illustrated in 602.

Referring to 601 of FIG. 6, the housing 600 may include a fixing holder 610 and a cover 620. The fixing holder 610 may fix the living creature sensor 1300, and may be connected to the processor 1100 of the washing machine 1000 through a wire. The cover 620 may cover the living creature sensor 1300 to protect it from the outside.

Referring to 602 of FIG. 6, the fixing holder 610 may include a seating portion inclined at a first angle 640, and the living creature sensor 1300 seated on the seating portion may be inclined at the first angle 640. The living creature sensor 1300 may be mounted on a printed circuit board 630.

In an embodiment of the disclosure, the housing 600 may be formed of a plastic material. Electromagnetic waves generated by the living creature sensor 1300 may pass through plastic, and thus, interference with the electromagnetic waves may be minimized. Accordingly, the accuracy of a sensing value of the living creature sensor 1300 may be improved. However, the disclosure is not limited thereto, and the housing 600 may be formed of other materials capable of minimizing electromagnetic interference with the living creature sensor 1300.

Figure 7:
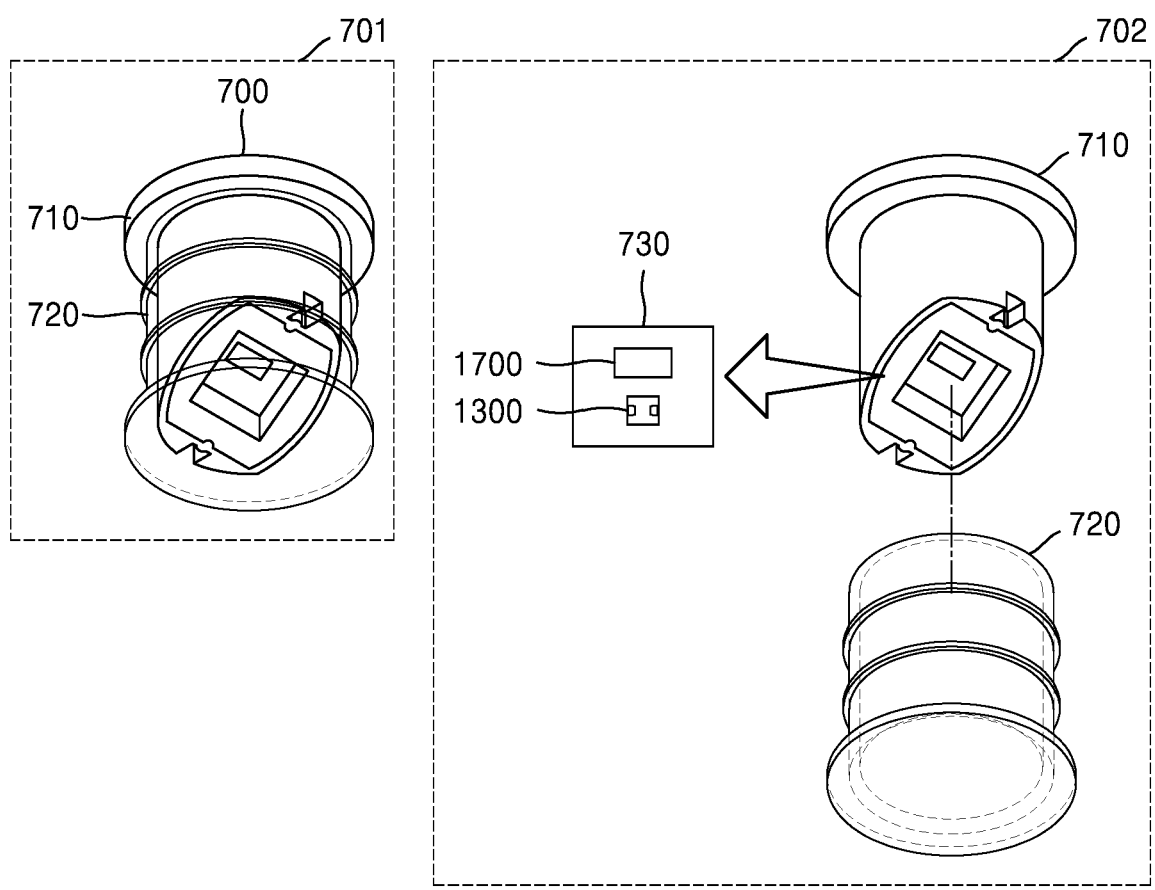
FIG. 7 is a perspective view of a configuration in which a living creature sensor and a light-emitting diode (LED) module are integrated, according to an embodiment of the disclosure.

FIG. 7 is a perspective view of a configuration in which a living creature sensor and an LED module are integrated, according to an embodiment of the disclosure.

Referring to FIG. 7, in an embodiment of the disclosure, the washing machine 1000 may include an integrated module 700 in which the living creature sensor 1300 and the light source module 1700 are integrated. In FIG. 7, a perspective view of the integrated module 700 is illustrated in 701, and an exploded perspective view of the integrated module 700 is illustrated in 702.

In an embodiment of the disclosure, the integrated module 700 may include a fixing holder 710 and a cover 720. The fixing holder 710 may fix the living creature sensor 1300 and the light source module 1700, and the cover 720 may cover the living creature sensor 1300 and the light source module 1700 to protect them from the outside. In this case, the cover 720 may be formed of a transparent material through which a light source of the light source module 1700 is transmitted. Like the housing 600 of FIG. 6, the integrated module 700 may be formed of a plastic material.

Referring to 702 of FIG. 7, the living creature sensor 1300 may be mounted on a printed circuit board 730 on which the light source module 1700 is mounted. That is, the integrated module 700 may include the living creature sensor 1300 and the light source module 1700. The integrated module 700 may detect a movement of a living creature inside the washing machine 1000, and may brighten the inside of the washing machine 1000.

In an embodiment of the disclosure, the integrated module 700 may be positioned on any one of the upper, lower, left, and right sides of the diaphragm 30, as in FIG. 4. In addition, the integrated module 700 may be mounted on the door 50 or the tub 20.

Figure 8:
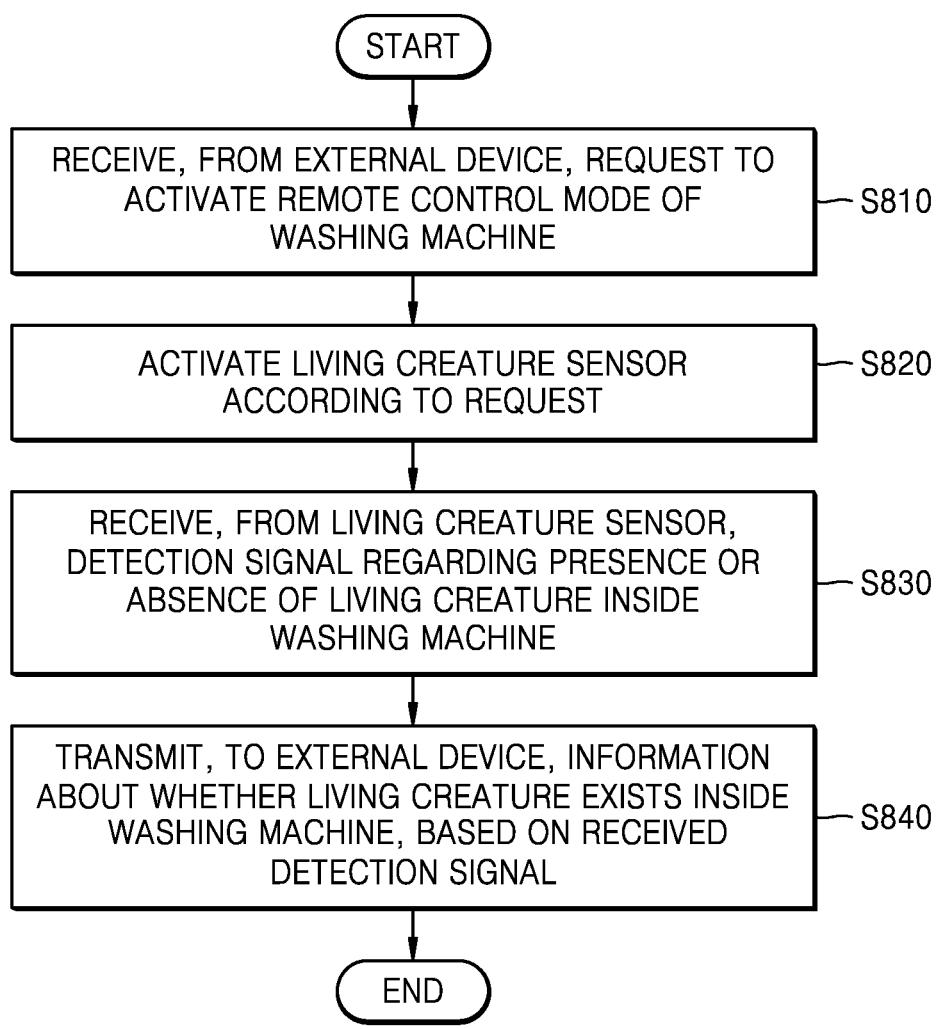
FIG. 8 is a flowchart for describing a method of controlling a washing machine according to an embodiment of the disclosure.

FIG. 8 is a flowchart for describing a method of controlling a washing machine according to an embodiment of the disclosure.

Referring to FIG. 8, in operation S810, the processor 1100 according to an embodiment of the disclosure may receive, from an external device, a request to activate a remote control mode of the washing machine 1000. For example, the external device may include a server or a mobile device of a user connected through a server.

For example, the remote control mode of the washing machine 1000 is a mode in which a user at a remote location may remotely operate and control the washing machine 1000 by using an external device. The washing machine 1000 may communicate with the external device through the communication interface 1200 including a wireless communication channel. The washing machine 1000 in the remote control mode may receive a remote control command from the external device. The washing machine 1000 may perform a washing operation according to the remote control command.

Based on receiving, through the communication interface 1200, the request to activate the remote control mode of the washing machine 1000, the processor 1100 according to an embodiment of the disclosure may control the washing machine 1000 to be powered on. In this case, the processor 1100 may include a sub-processor operating in a low-power mode. The processor 1100 may perform an operation of powering on the washing machine 1000, through the sub-processor.

In operation S820, the processor 1100 according to an embodiment of the disclosure may activate the living creature sensor 1300 according to the request. For example, the processor 1100 may control the living creature sensor 1300 to be powered on.

Before receiving a remote control command in the remote control mode, the processor 1100 according to an embodiment of the disclosure may activate the living creature sensor 1300 to identify whether a living creature exists inside the washing machine 1000.

According to an embodiment of the disclosure, the activated living creature sensor 1300 may measure a sensing value according to a movement of a living creature inside the washing machine 1000. The living creature sensor 1300 may transmit, to the processor 1100, a detection signal regarding the presence or absence of a living creature, based on the sensing value.

According to an embodiment of the disclosure, the activated living creature sensor 1300 may measure a distance value between the living creature inside the washing machine 1000 and the living creature sensor 1300. The living creature sensor 1300 may transmit, to the processor 1100, a detection signal regarding the presence or absence of a living creature, based on the distance value.

In operation S830, the processor 1100 according to an embodiment of the disclosure may receive, from the living creature sensor 1300, the detection signal regarding the presence or absence of a living creature inside the washing machine 1000. For example, the processor 1100 may receive, from the living creature sensor 1300, a detection signal regarding the presence of a living creature inside the washing machine 1000. For example, the processor 1100 may receive, from the living creature sensor 1300, a detection signal regarding the absence of a living creature inside the washing machine 1000.

In operation S840, the processor 1100 according to an embodiment of the disclosure may transmit, to the external device, information about whether a living creature exists inside the washing machine 1000, based on the received detection signal. For example, the external device may include a server or the mobile device 2000 of the user connected through a server.

In a case in which the processor 1100 according to an embodiment of the disclosure receives, from the living creature sensor 1300, a detection signal regarding the presence of a living creature inside the washing machine 1000, the processor 1100 may transmit information about the presence of the living creature inside the washing machine 1000, to the external device through the communication interface 1200. In addition, in a case in which the processor 1100 according to an embodiment of the disclosure receives, from the living creature sensor 1300, a detection signal regarding the absence of a living creature inside the washing machine 1000, the processor 1100 may transmit information about the absence of a living creature inside the washing machine 1000, to the external device through the communication interface 1200.

Figure 9:
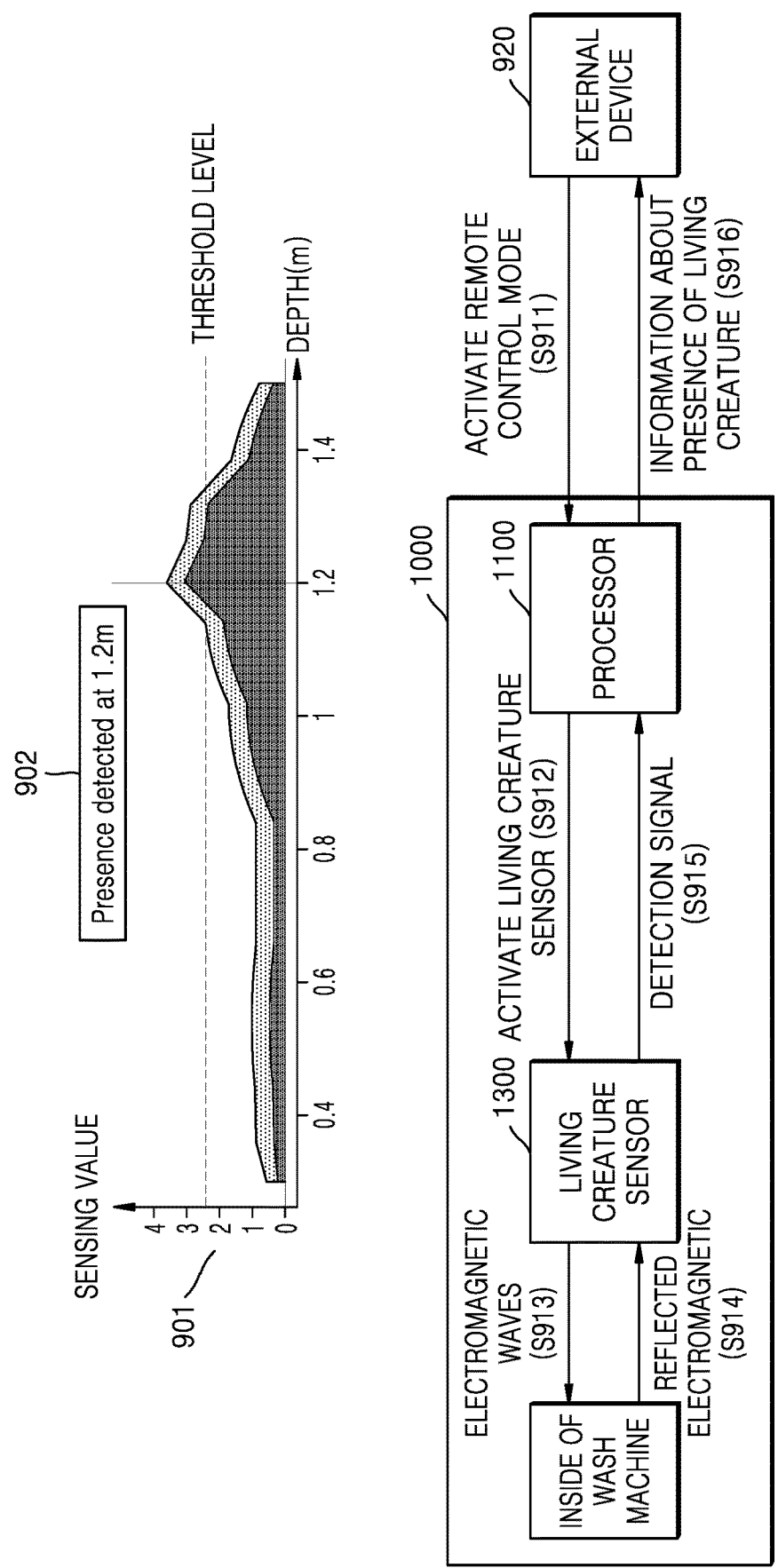
FIG. 9 is a diagram illustrating an operation performed by a washing machine in a case in which a living creature exists inside the washing machine, according to an embodiment of the disclosure.

FIG. 9 is a diagram illustrating an operation performed by a washing machine in a case in which a living creature exists inside the washing machine, according to an embodiment of the disclosure.

Operations performed the living creature sensor 1300, the processor 1100, and an external device 920 in a case in which a living creature exists inside the washing machine 1000 will be described with reference to FIG. 9.

The external device 920 according to an embodiment of the disclosure may transmit a request to activate a remote control mode of the washing machine 1000 (S911). Based on receiving the request to activate the remote control mode of the washing machine 1000 (S911), the processor 1100 according to an embodiment of the disclosure may control the washing machine 1000 to be powered on. The processor 1100 may perform an operation of powering on the washing machine 1000.

In response to the request, the processor 1100 according to an embodiment of the disclosure may activate the living creature sensor 1300 (S912). For example, the processor 1100 may control the washing machine 1000 and the living creature sensor 1300 to be powered on, according to the request. The living creature sensor 1300 may be activated by the processor 1100.

According to an embodiment of the disclosure, the activated living creature sensor 1300 may detect the presence of a living creature and/or measure the distance to the living creature, by transmitting millimeter (mm) electromagnetic waves through a millimeter-wave radar (S913), and receiving the electromagnetic waves reflected from a living creature (S914). For example, the living creature sensor 1300 may measure a sensing value according to a movement of a living creature inside the washing machine 1000. For example, the living creature sensor 1300 may measure a distance value between the living creature inside the washing machine 1000 and the living creature sensor 1300.

Referring to the graph in 901 of FIG. 9, the living creature sensor 1300 may determine whether a living creature exists inside the washing machine 1000, through a measured sensing value. In 901 of FIG. 9, the X axis represents the depth or distance of the living creature from the living creature sensor 1300, and the Y axis represents the sensing value according to the movement of the living creature. For example, the living creature sensor 1300 may measure a sensing value that is greater than or equal to a threshold level, at a depth 1.2 m from the living creature sensor 1300, and determine that a living creature exists at a depth 1.2 m from the living creature sensor 1300.

Referring to 902 of FIG. 9, the living creature sensor 1300 may measure a distance value between the living creature and the living creature sensor 1300. For example, the living creature sensor 1300 may determine that the living creature exists at a distance of 1.2 m from the living creature sensor 1300. Meanwhile, the living creature sensor 1300 may omit a process of measuring a distance value.

The living creature sensor 1300 according to an embodiment of the disclosure may transmit, to the processor 1100, a detection signal regarding the presence of the living creature, based on the sensing value according to the movement of the living creature (S915). The living creature sensor 1300 may transmit, to the processor 1100, a detection signal regarding the presence of the living creature, based on the distance value between the living creature and the living creature sensor 1300 (S915). For example, the processor 1100 may receive, from the living creature sensor 1300, '1' or 'high level', which is the detection signal regarding the presence of the living creature, or '0' or 'low level'.

Meanwhile, the living creature sensor 1300 according to an embodiment of the disclosure may transmit, to the processor 1100, a detection signal including the sensing value according to the movement of the living creature. The processor 1100 may compare the received detection signal with a threshold level, and based on the detection signal being greater than or equal to the threshold level, determine that a living creature exists.

Based on the received detection signal, the processor 1100 according to an embodiment of the disclosure may transmit, to the external device 920, information about the presence of the living creature inside the washing machine 1000 (S916). As the processor 1100 transmits, to the external device 920, the information about the presence of the living creature inside the washing machine 1000, remote control of the washing machine 1000 may be restricted. For example, the external device 920 may deactivate a remote control button for controlling the washing machine 1000. In other words, the processor 1100 may prevent the washing machine 1000 from being remotely operated when a living creature exists inside the washing machine 1000.

Figure 10:
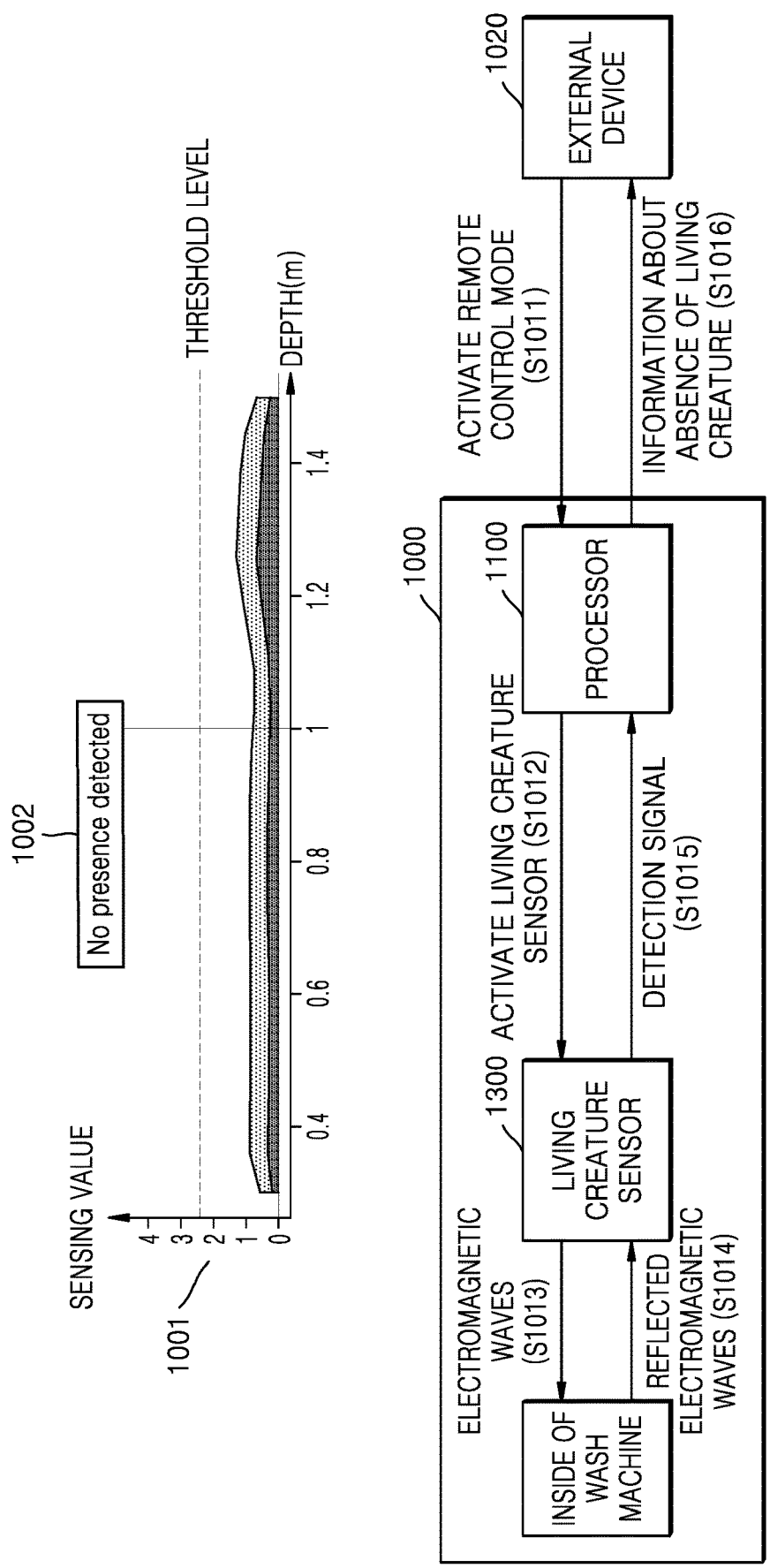
FIG. 10 is a diagram illustrating an operation performed by a washing machine in a case in which no living creature exists inside the washing machine, according to an embodiment of the disclosure.

FIG. 10 is a diagram illustrating an operation performed by a washing machine in a case in which no living creature exists inside the washing machine, according to an embodiment of the disclosure.

Operations performed the living creature sensor 1300, the processor 1100, and an external device 1020 in a case in which no living creature exists inside the washing machine 1000 will be described with reference to FIG. 10.

The external device 1020 according to an embodiment of the disclosure may transmit a request to activate a remote control mode of the washing machine 1000 (S1011). Operation S1011 corresponds to operation S911 of FIG. 9, and thus, descriptions thereof will be omitted.

In response to the request, the processor 1100 according to an embodiment of the disclosure may activate the living creature sensor 1300 (S1012). Operation S1012 corresponds to operation S912 of FIG. 9, and thus, descriptions thereof will be omitted.

According to an embodiment of the disclosure, the activated living creature sensor 1300 may detect the presence of a living creature and/or measure the distance to the living creature, by transmitting millimeter (mm) electromagnetic waves through a millimeter-wave radar (S1013), and receiving the electromagnetic waves reflected from a living creature (S1014).

Referring to the graph in 1001 of FIG. 10, the living creature sensor 1300 may determine whether a living creature exists inside the washing machine 1000, through a measured sensing value. For example, the living creature sensor 1300 may measure a sensing value that is less than a threshold level, and determine that no living creature exists inside the washing machine 1000.

Referring to 1002 of FIG. 10, because no living creature exists inside the washing machine 1000, the living creature sensor 1300 may not measure a distance value to a living creature.

The living creature sensor 1300 according to an embodiment of the disclosure may transmit, to the processor 1100, a detection signal regarding the absence of a living creature, based on the sensing value (S1015). The living creature sensor 1300 may transmit, to the processor 1100, a detection signal regarding the absence of a living creature (S1015). For example, the processor 1100 may receive, from the living creature sensor 1300, '0' or 'low level', which is the detection signal regarding the absence of a living creature, or '1' or 'high level'.

Meanwhile, the living creature sensor 1300 according to an embodiment of the disclosure may transmit, to the processor 1100, a detection signal including the sensing value. The processor 1100 may compare the received detection signal with a threshold level, and based on the detection signal being less than the threshold level, determine that no living creature exists.

Based on the received detection signal, the processor 1100 according to an embodiment of the disclosure may transmit, to the external device 920, information about the absence of a living creature inside the washing machine 1000 (S1016). As the processor 1100 transmits, to the external device 1020, the information about the absence of a living creature inside the washing machine 1000, a remote control command related to a washing operation may be received from the external device 1020. The washing machine 1000 may perform the washing operation in response to the remote control command from the external device 1020. The washing machine 1000 may be remotely controlled through the external device 1020.

Figure 11:
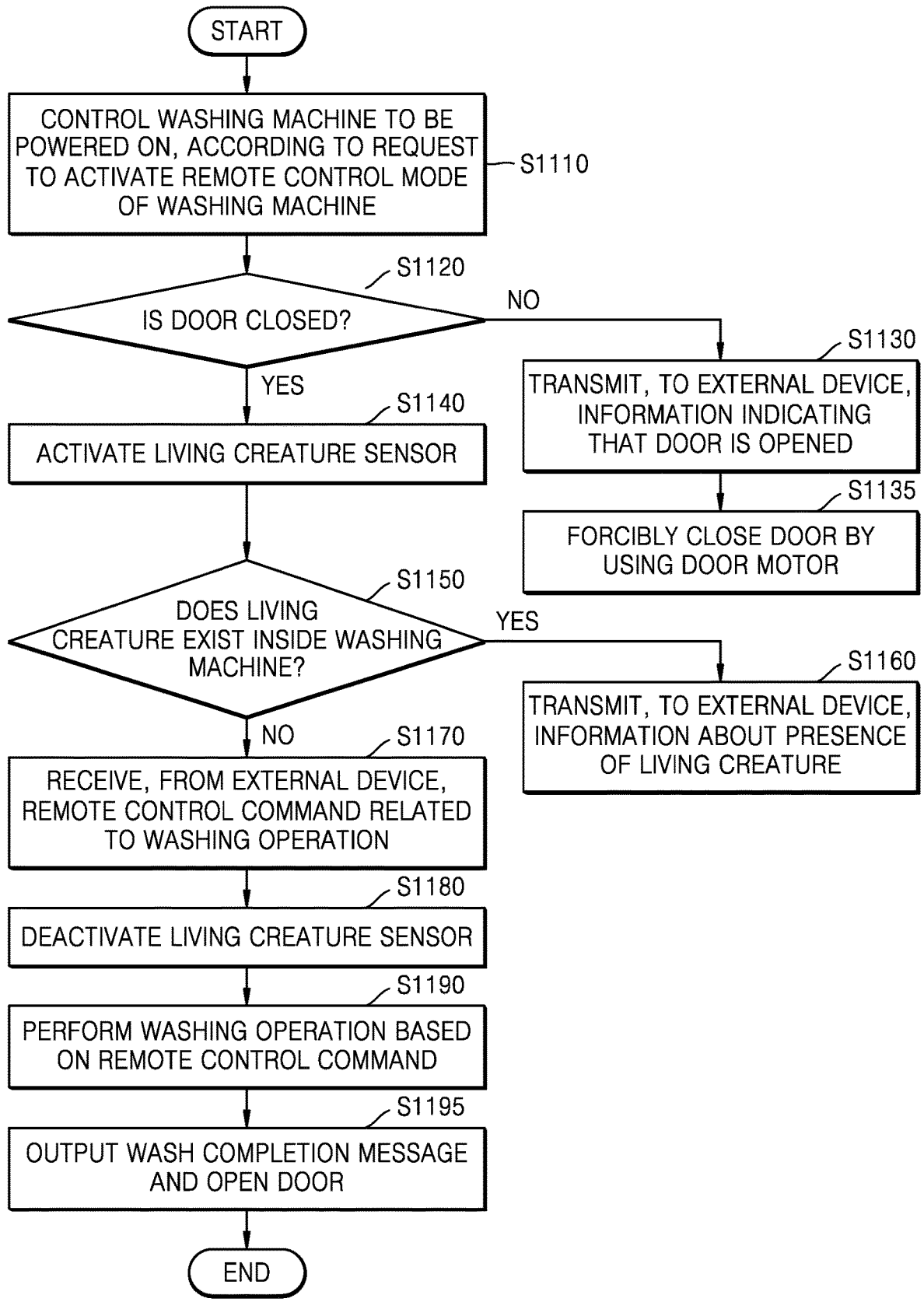
FIG. 11 is a flowchart illustrating a method of operating a washing machine according to remote control according to an embodiment of the disclosure.

FIG. 11 is a flowchart illustrating a method of operating a washing machine according to remote control according to an embodiment of the disclosure.

Referring to FIG. 11, in operation S1110, the processor 1100 may control the washing machine 1000 to be powered on, according to a request to activate a remote control mode of the washing machine 1000. Operation S1110 will be described in detail with reference to FIG. 12.

Figure 12:
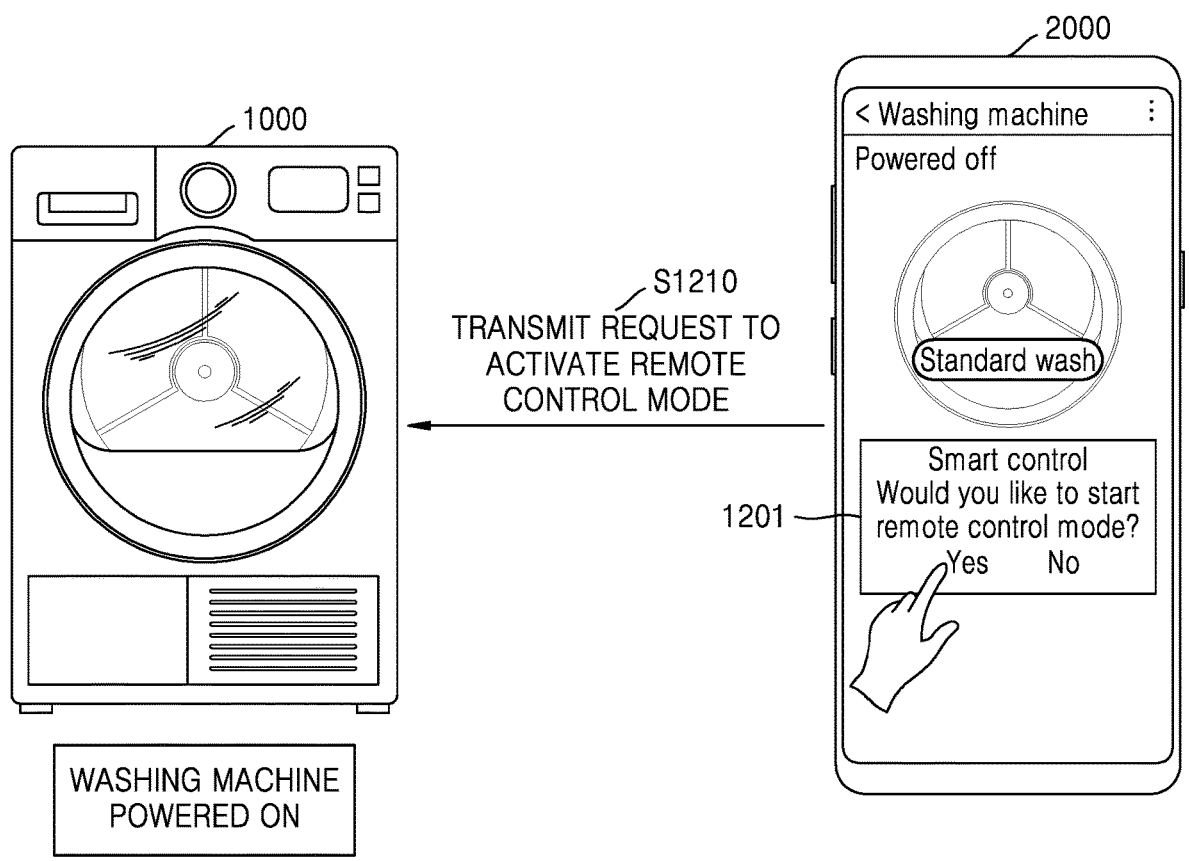
FIG. 12 is a diagram for describing an operation of activating a remote control mode of a washing machine according to an embodiment of the disclosure.

FIG. 12 is a diagram for describing an operation of powering on a washing machine according to an embodiment of the disclosure.

The mobile device 2000 according to an embodiment of the disclosure may execute an application for managing a home appliance of a user. The mobile device 2000 may be connected to a server (not shown) through an application installed in the mobile device 2000, and may display information provided by the server.

According to an embodiment of the disclosure, the mobile device 2000 may be a device connected to the server with the same account information as that of the washing machine 1000. The mobile device 2000 may be indirectly connected to the washing machine 1000 through the server (not shown), or may be directly connected to the washing machine 1000 through a short-range wireless communication channel.

The mobile device 2000 according to an embodiment of the disclosure may display, on an application execution window, an inquiry screen 1201 for activating the remote control mode of the washing machine 1000. When the user selects "Yes" or "No" on the inquiry screen 1201, the mobile device 2000 may receive an input regarding whether to start the remote control mode of the washing machine 1000. For example, the user may input "Yes" to start the remote control mode of the washing machine 1000, and the mobile device 2000 may transmit a request to activate the remote control mode, according to the user input (S1210). The mobile device 2000 may transmit the request to the washing machine 1000 through the server, or may directly transmit the request to the washing machine 1000 through a short-range wireless communication channel.

The washing machine 1000 according to an embodiment of the disclosure may control the washing machine 1000 to be powered on, according to the request to activate the remote control mode received from the mobile device 2000. The washing machine 1000 may be powered on according to the remote control mode.

In operation S1120, as the washing machine 1000 is powered on, the processor 1100 may identify, through a door sensor 1810, whether the door 50 of the washing machine 1000 is closed. For example, the washing machine 1000 may perform operation S1130 or S1135, based on determining that the door 50 of the washing machine 1000 is opened, based on an output signal of the door sensor 1810. For example, the washing machine 1000 may perform operation S1140, based on determining that the door 50 of the washing machine 1000 is closed, based on the output signal of the door sensor 1810.

In operation S1130, as the processor 1100 identifies, based on the output signal of the door sensor 1810, that the door 50 is opened, the processor 1100 may transmit, to an external device, information indicating that the door 50 is opened. For example, the external device may be the mobile device 2000. In operation S1135, the processor 1100 may control the door 50 to be forcibly closed by using a door motor 1820. Operations S1130 and S1135 will be described in detail with reference to FIG. 13.

Figure 13:
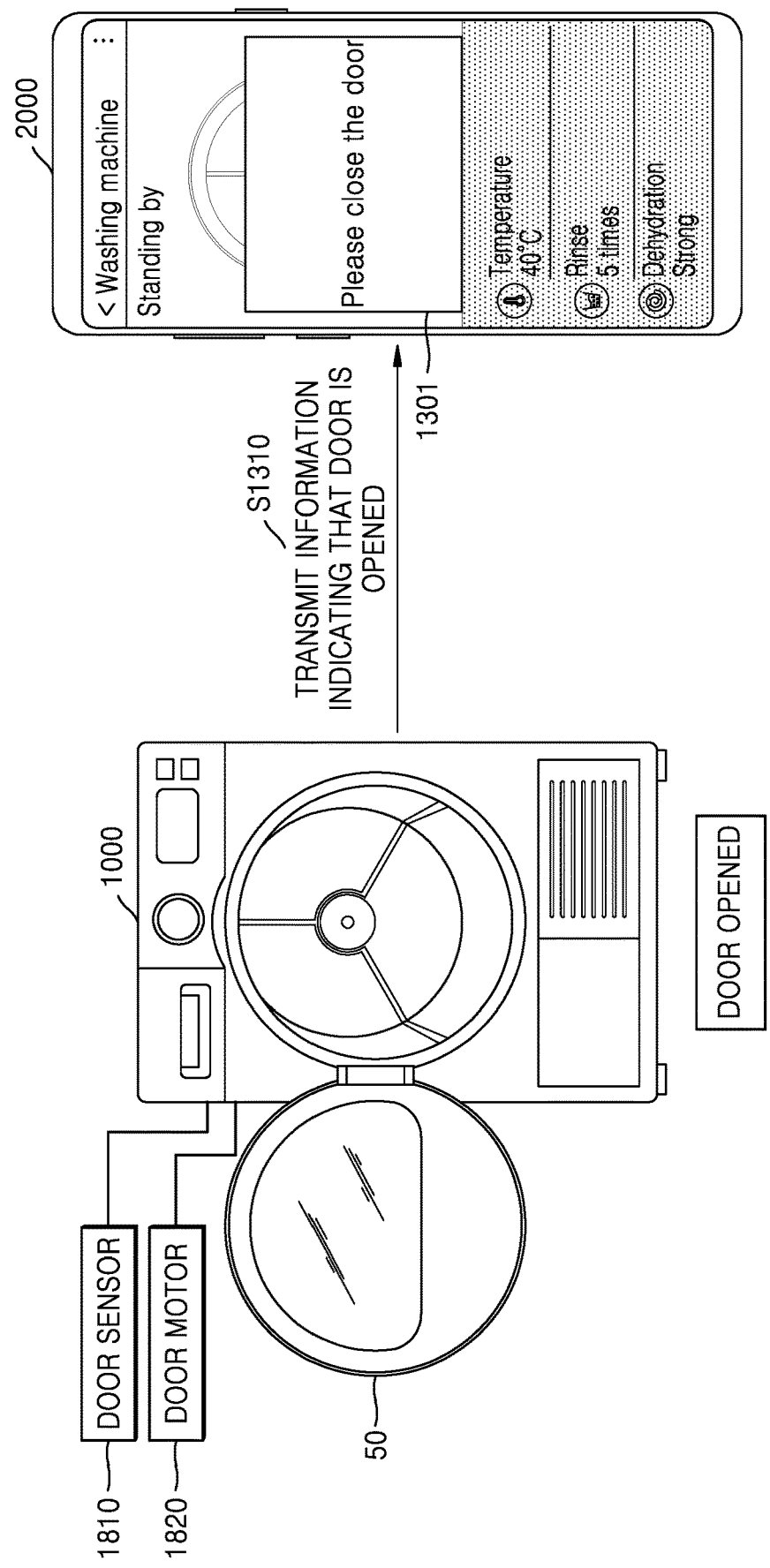
FIG. 13 is a diagram for describing an operation of identifying that a door of a washing machine is opened, according to an embodiment of the disclosure.

FIG. 13 is a diagram for describing an operation of identifying that a door of a washing machine is opened, according to an embodiment of the disclosure.

The washing machine 1000 according to an embodiment of the disclosure may further include the door sensor 1810. The door sensor 1810 may be a sensor configured to detect whether the door 50 is closed. For example, the door sensor 1810 may be a magnetic sensor configured to measure a magnetic flux value of a magnetic material attached to the door 50, and detect, based on the magnetic flux value, whether the door is closed. The door sensor 1810 may include a reed switch, a tunnel magnetoresistance (TMR) sensor, a Hall sensor, and the like. The door sensor 1810 may output, to the processor 1100, information indicating that the door is closed or opened, based on the magnetic flux value. However, the door sensor 1810 is not limited to the magnetic sensor.

The washing machine 1000 according to an embodiment of the disclosure may identify that the door 50 is opened, based on an output signal of the door sensor 1810. The washing machine 1000 may transmit, to the mobile device 2000, information indicating that the door is opened (S1310).

Based on receiving the information indicating that the door is opened, the mobile device 2000 according to an embodiment of the disclosure may display, on the application execution window, a message 1301 stating "Please close the door". After confirming the message 1303, the user may manually close the door 50.

In a case in which the washing machine 1000 according to an embodiment of the disclosure further includes the door motor 1820, the processor 1100 of the washing machine 1000 may perform an operation of closing the door 50 by controlling the direction and speed of the door motor 1820. The door 50 may be forcibly closed by the door motor 1820. In this case, the door 50 of the washing machine 1000 may be closed without requiring the user to manually close the door 50, and thus, user convenience may be improved.

In operation S1140, based on identifying that the door 50 is closed, based on the output signal of the door sensor 1810, the processor 1100 may activate the living creature sensor 1300. Operation S1140 will be described in detail with reference to FIG. 14.

Figure 14:
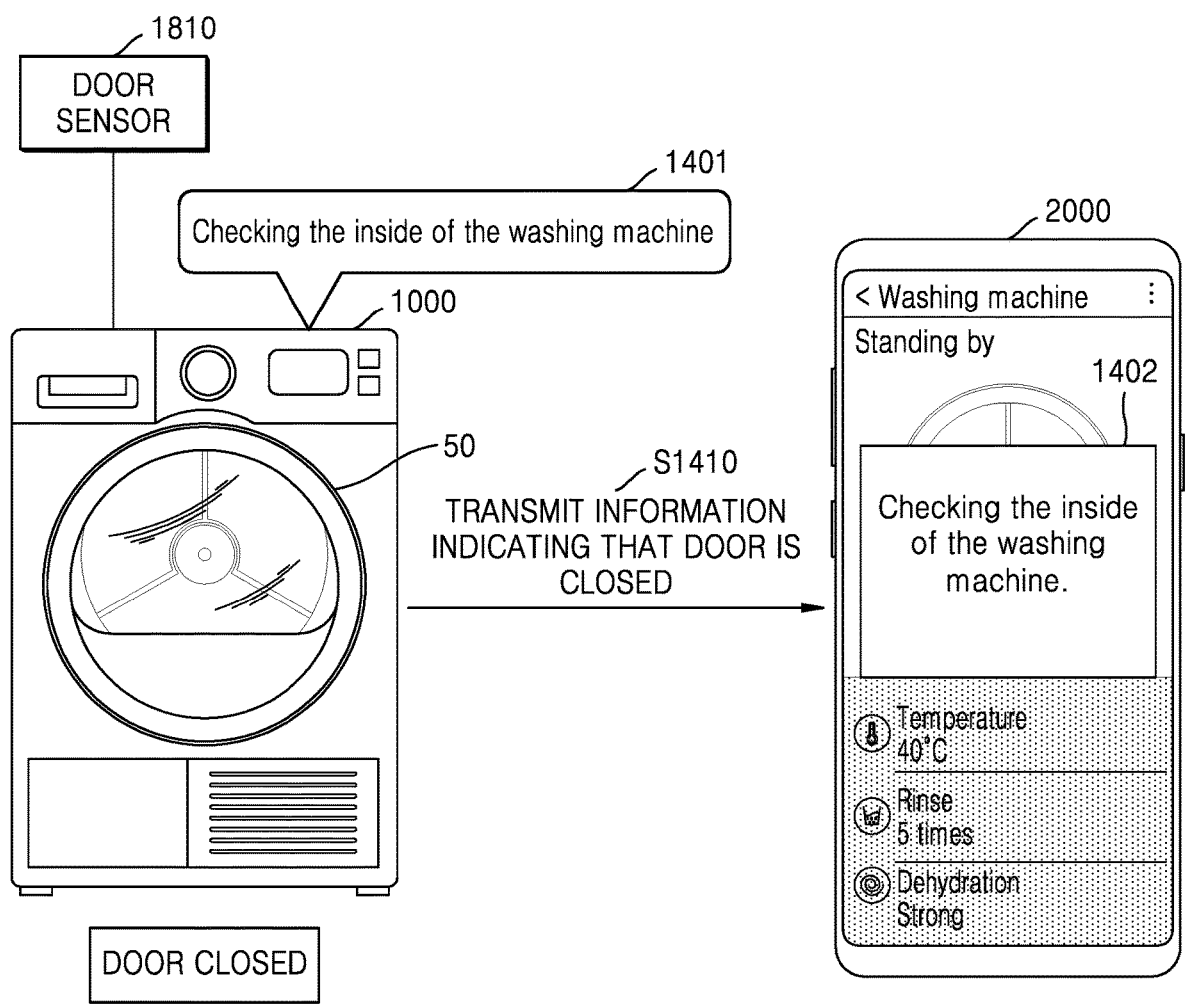
FIG. 14 is a diagram for describing an operation of identifying that a door of a washing machine is closed, according to an embodiment of the disclosure.

FIG. 14 is a diagram for describing an operation of identifying that a door of a washing machine is closed, according to an embodiment of the disclosure.

The washing machine 1000 according to an embodiment of the disclosure may identify that the door 50 is closed, based on an output signal of the door sensor 1810. As the washing machine 1000 according to an embodiment of the disclosure identifies that the door 50 is closed, the washing machine 1000 may activate the living creature sensor 1300 to identify whether a living creature exists inside the washing machine 1000. The washing machine 1000 may output, through the user interface 1400, a message 1401 stating "Checking the inside of the washing machine". The washing machine 1000 may control the living creature sensor 1300 to be powered on. The activated living creature sensor 1300 may transmit, to the processor 1100 of the washing machine 1000, a detection signal regarding whether a living creature exists inside the washing machine 1000.

The washing machine 1000 may transmit, to the mobile device 2000, information indicating that the door is closed (S1410). Based on receiving the information indicating that the door is closed, the mobile device 2000 according to an embodiment of the disclosure may display, on the application execution window, a message 1402 stating "Checking the inside of the washing machine".

The washing machine 1000 and the mobile device 2000 according to an embodiment of the disclosure may display the messages 1401 and 1402, respectively, until the living creature sensor 1300 completes an operation of detecting the inside of the washing machine 1000.

In operation S1150, the processor 1100 may determine whether a living creature exists inside the washing machine 1000, based on a detection signal received from the living creature sensor 1300. For example, based on identifying that a living creature exists inside the washing machine 1000, based on the detection signal received from the living creature sensor 1300, the processor 1100 may perform operation S1160. For example, based on identifying that no living creature exists inside the washing machine 1000, based on the detection signal received from the living creature sensor 1300, the processor 1100 may perform operation S1170.

In operation S1160, based on determining that a living creature exists inside the washing machine 1000, the processor 1100 may transmit, to the external device, information about the presence of the living creature. Operation S1160 will be described in detail with reference to FIG. 15.

Figure 15:
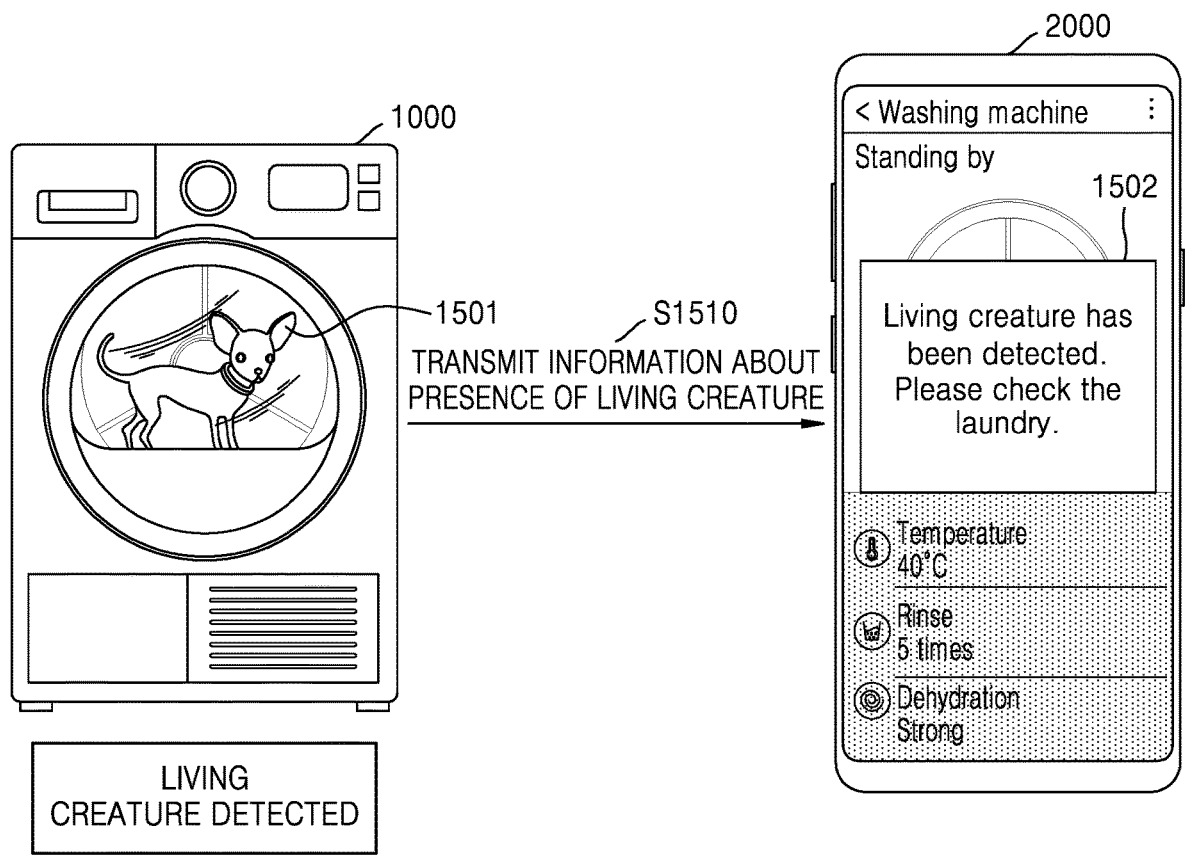
FIG. 15 is a diagram for describing an operation performed by a washing machine in a case in which the presence of a living creature inside the washing machine is detected, according to an embodiment of the disclosure.

FIG. 15 is a diagram for describing an operation performed by a washing machine in a case in which the presence of a living creature inside the washing machine is detected, according to an embodiment of the disclosure.

The washing machine 1000 according to an embodiment of the disclosure may receive, from the living creature sensor 1300, a detection signal regarding the presence of the living creature inside the washing machine 1000. The washing machine 1000 may determine, based on the received detection signal, that a living creature 1501 exists inside the washing machine 1000. The washing machine 1000 may transmit, to the mobile device 2000, information about the presence of the living creature (S1510).

Based on receiving the information about the presence of the living creature, the mobile device 2000 according to an embodiment of the disclosure may display a message 1502 stating "Living creature has been detected. Please check the laundry". In this case, the mobile device 2000 is unable to remotely control the washing machine 1000 through an application. All remote control buttons of the mobile device 2000 related to washing course and wash options may be in an inactive state. In a case in which all of the remote control buttons of the mobile device 2000 are in the inactive state, a shadow may be indicated in areas including the remote control buttons.

In operation S1170, the processor 1100 may receive, from the external device, a remote control command related to a washing operation. Operation S1160 will be described in detail with reference to FIG. 16.

Figure 16:
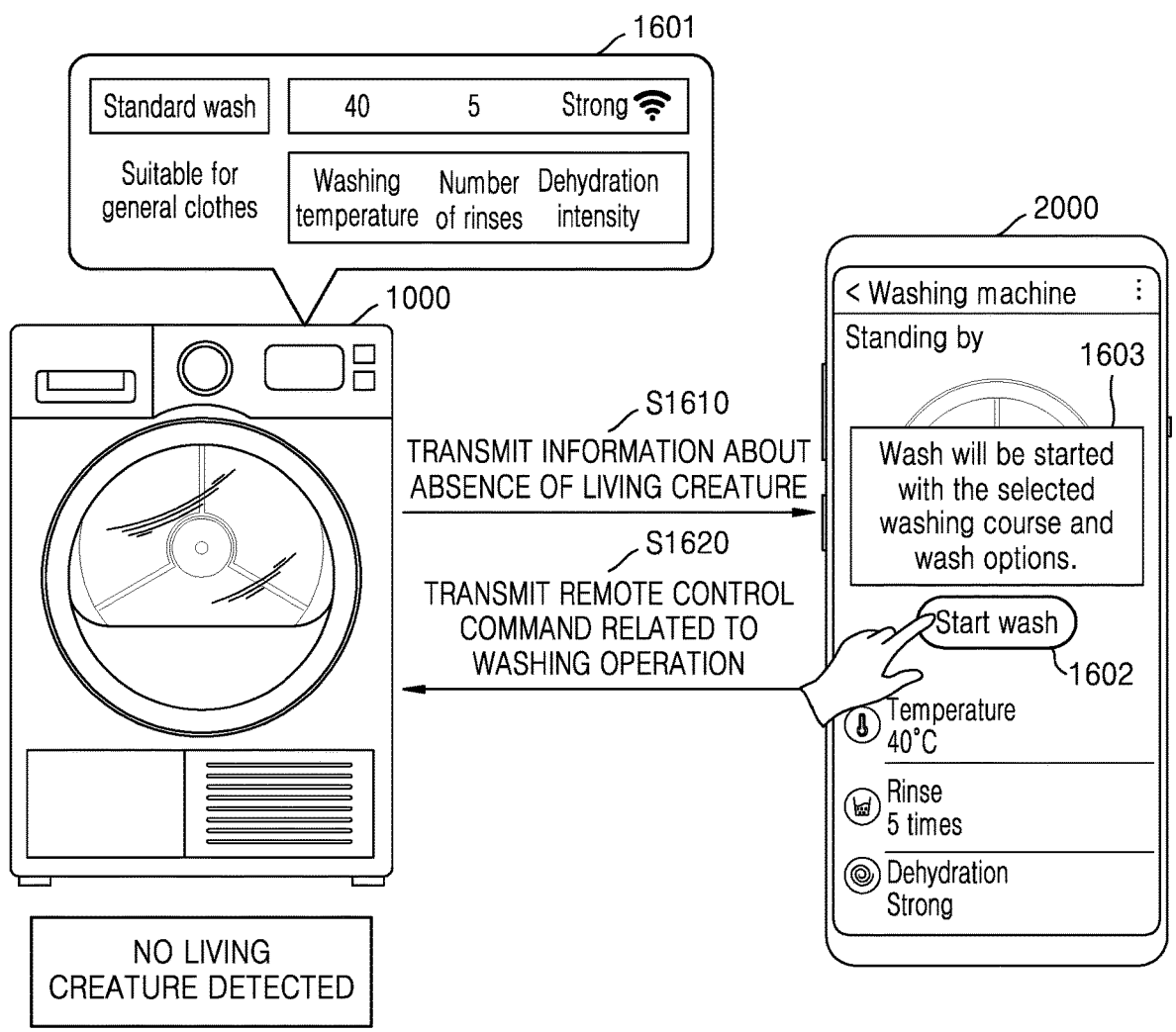
FIG. 16 is a diagram for describing an operation performed by a washing machine according to a remote control command in a case in which the presence of a living creature inside the washing machine is not detected, according to an embodiment of the disclosure.

FIG. 16 is a diagram for describing an operation performed by a washing machine according to a remote control command in a case in which the presence of a living creature inside the washing machine is not detected, according to an embodiment of the disclosure.

The washing machine 1000 according to an embodiment of the disclosure may receive, from the living creature sensor 1300, a detection signal regarding the absence of a living creature inside the washing machine 1000. The washing machine 1000 may determine, based on the received detection signal, that no living creature exists inside the washing machine 1000. The washing machine 1000 may transmit, to the mobile device 2000, information about the absence of a living creature (S1610).

Based on receiving the information about the absence of a living creature, the mobile device 2000 according to an embodiment of the disclosure may activate a remote control button 1602 displayed on the application execution window. For example, the remote control button 1602 may include a washing course, a wash options, initiation of a washing operation, a pause of the washing operation, and the like. For example, the washing course may include a standard wash, an artificial intelligence (AI) custom wash, a strong wash, a wool wash, a bedding was, a rinse/dehydration, a dehydration, and the like. For example, the wash options may include a washing temperature, the number of rinses, dehydration intensity, and the like.

The mobile device 2000 according to an embodiment of the disclosure may receive a remote control input of the user for selecting the remote control button 1602 related to the washing machine 1000 (e.g., a washing course, wash options, or initiation of a washing operation). Based on receiving the remote control input of the user, the mobile device 2000 may display, on the application execution window, a message 1603 stating "Wash will be started with the selected washing course and wash options".

The mobile device 2000 according to an embodiment of the disclosure may transmit, to the washing machine 1000, a remote control command corresponding to the remote control input of the user related to the washing machine 1000 (S1620). The washing machine 1000 may receive the remote control command from the mobile device 2000.

The washing machine 1000 according to an embodiment of the disclosure may output operation information of the washing machine 1000, based on the received remote control command. For example, the washing machine 1000 may output, through the user interface 1400, operation information 1601 related to a washing course and wash options.

In operation S1180, the processor 1100 may deactivate the living creature sensor 1300, based on receiving the remote control command from the external device. For example, the processor 1100 may control the living creature sensor 1300 to be powered off. In addition, in operation S1190, the processor 1100 may perform a washing operation based on the remote control command. The living creature sensor 1300 may be deactivated while the washing operation is performed. For example, the processor 1100 may perform a washing cycle, a rinse cycle, a dehydration cycle, and the like on laundry.

In operation S1195, the processor 1100 may output a wash completion message and control the door 50 of the washing machine 1000 to be opened. Operation S1195 will be described in detail with reference to FIG. 17.

Figure 17:
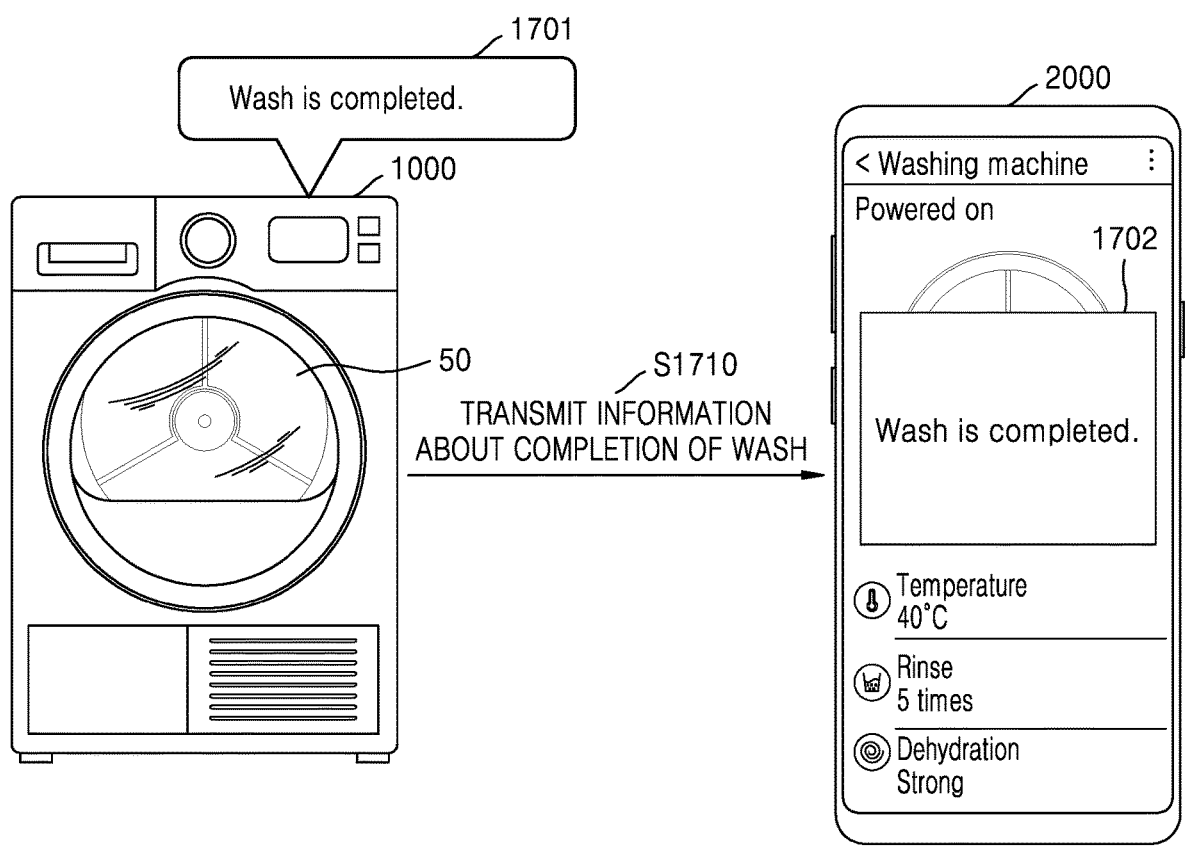
FIG. 17 is a diagram for describing an operation of a washing machine related to completion of a wash, according to an embodiment of the disclosure.

FIG. 17 is a diagram for describing an operation of a washing machine related to completion of a wash, according to an embodiment of the disclosure.

Based on completion of a wash, the washing machine 1000 according to an embodiment of the disclosure may output, through the user interface 1400, a message 1701 stating "Wash is completed".

The washing machine 1000 according to an embodiment of the disclosure may control the door motor 1820 to open the door 50. The door 50 may be forcibly opened by the door motor 1820.

The washing machine 1000 according to an embodiment of the disclosure may transmit, to the mobile device 2000, information about the completion of the wash (S1710).

Based on receiving the information about the completion of the wash, the mobile device 2000 according to an embodiment of the disclosure may display, on the application execution window, a message 1702 stating "Wash is completed".

According to an embodiment of the disclosure, after identifying whether a living creature exists inside the washing machine 1000, the washing machine 1000 may be remotely controlled through the external device. The washing machine 1000 may be remotely controlled according to safety standards, user convenience may be improved.

Hereinafter, a method of remotely controlling the washing machine 1000 according to an embodiment of the disclosure will be described.

Figure 18:
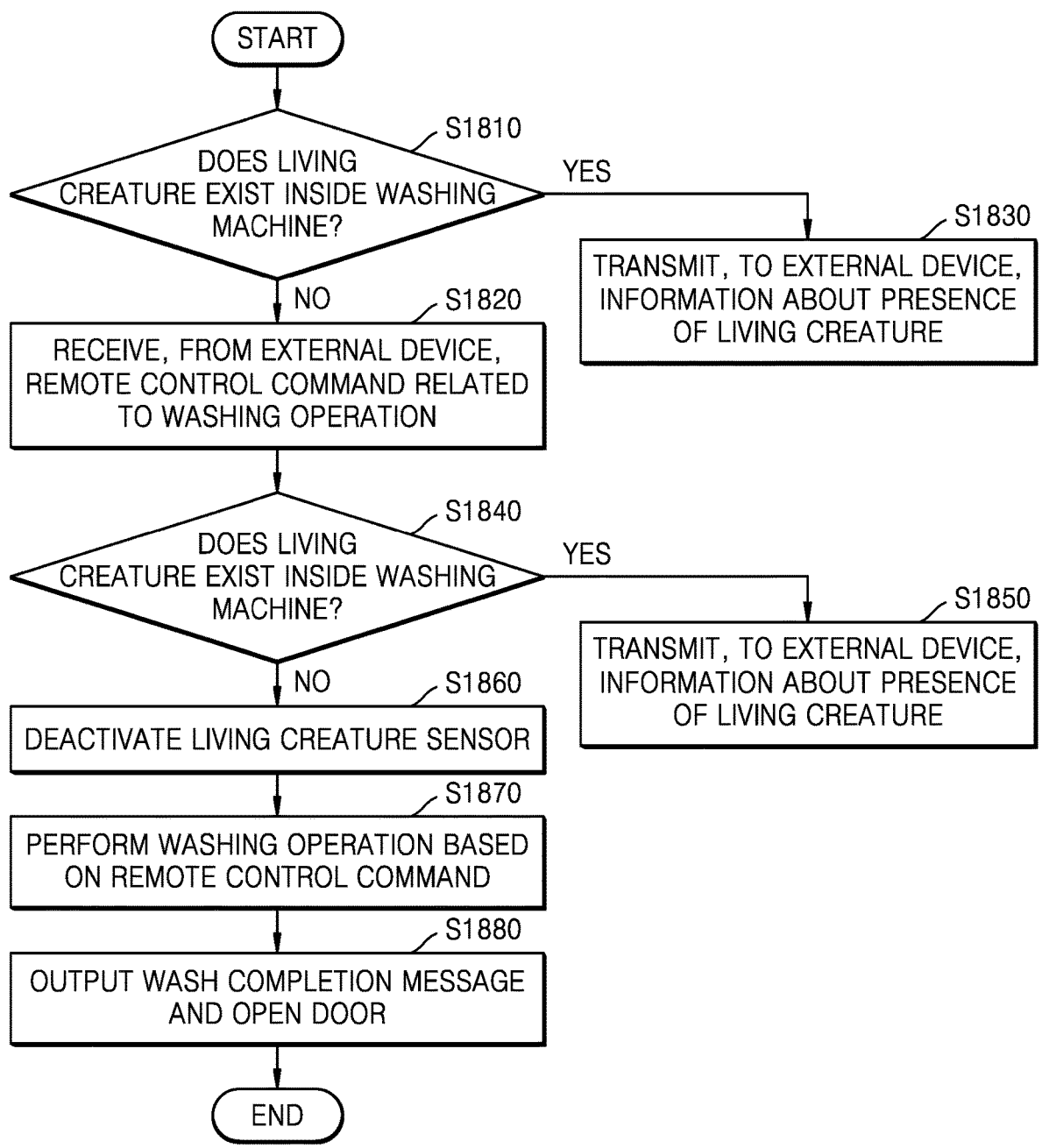
FIG. 18 is a flowchart illustrating a method of operating a washing machine according to remote control according to an embodiment of the disclosure.

FIG. 18 is a flowchart illustrating a method of operating a washing machine according to remote control according to an embodiment of the disclosure.

In a case in which the living creature sensor 1300 is activated as in the above-described embodiment of the disclosure, the washing machine 1000 according to an embodiment of the disclosure may identify the presence or absence of a living creature inside the washing machine 1000. In addition, after receiving the remote control command and before performing a washing operation, the processor 1100 may identify once again the presence of absence of a living creature inside the washing machine 1000.

In operation S1810, the processor 1100 may determine whether a living creature exists inside the washing machine 1000, based on a detection signal received from the living creature sensor 1300. Operation S1810 may correspond to operation S1150 of FIG. 11.

In operation S1820, the processor 1100 may receive, from the external device, a remote control command related to a washing operation. Operation S1820 may correspond to operation S1170 of FIG. 11.

In operation S1830, based on determining that a living creature exists inside the washing machine 1000, the processor 1100 may transmit, to the external device, information about the presence of the living creature. Operation S1830 may correspond to operation S1160 of FIG. 11.

In operation S1840, based on receiving the remote control command related to the washing operation, the processor 1100 may determine again, through the living creature sensor 1300, whether a living creature exists inside the washing machine 1000. The processor 1100 may receive again, from the living creature sensor 1300, a detection signal regarding the presence or absence of a living creature inside the washing machine 1000.

In operation S1850, the processor 1100 may transmit, to the external device, information about whether a living creature exists inside the washing machine 1000, based on the received detection signal. For example, based on determining that a living creature exists inside the washing machine 1000, the processor 1100 may transmit, to the external device, a signal for stopping the remote control. For example, based on determining that a living creature exists inside the washing machine 1000, the processor 1100 may cancel a remote control command previously received from the external device. For example, based on determining that a living creature exists inside the washing machine 1000, the processor 1100 may transmit, to the external device, information about the presence of the living creature. The external device that has received the information about the presence of the living creature may output a message stating, for example, "Living creature has been detected".

In operation S1860, the processor 1100 may deactivate the living creature sensor 1300 based on the received detection signal. Operation S1860 may correspond to operation S1180 of FIG. 11.

In operation S1870, the processor 1100 may perform a washing operation based on the remote control command. Operation S1870 may correspond to operation S1190 of FIG. 11.

In operation S1880, the processor 1100 may output a wash completion message and control the door 50 of the washing machine 1000 to be opened. Operation S1880 may correspond to operation S1195 of FIG. 11.

The washing machine 1000 according to an embodiment of the disclosure may minimize safety accidents by determining, through the living creature sensor 1300, the presence or absence of a living creature inside the washing machine 1000, two or more times.

FIG. 19 is a flowchart for describing a method of operating a washing machine in connection with a server and a mobile device, according to an embodiment of the disclosure.

Referring to FIG. 19, a washing machine management system according to an embodiment of the disclosure may further include, in addition to the washing machine 1000, the mobile device 2000 and a server 3000. The mobile device 2000 or the washing machine 1000 may operate as a client device capable of communicating with the server 3000.

According to an embodiment of the disclosure, the server 3000 may include a communication interface for communicating with an external device. The server 3000 may communicate with the washing machine 1000 or the mobile device 2000 through a communication interface. According to an embodiment of the disclosure, the washing machine 1000 may transmit, to the server 3000, identification information of the washing machine 1000 or identification information of a user (e.g., login information or account information), be authenticated by the server 3000 with the identification information of the washing machine 1000 or the identification information of the user (e.g., login information or account information), and thus access the server 3000.

The mobile device 2000 according to an embodiment of the disclosure may be a device that is connected to the server 3000 and displays information provided by the server 3000. According to an embodiment of the disclosure, the mobile device 2000 may transmit and receive information to and from the server 3000 through a particular application (e.g., a home appliance management application) installed in the mobile device 2000.

When the user executes an application for managing the user's home appliances on the mobile device 2000, the mobile device 2000 may receive information from the server 3000 and then display, on an application execution window, a screen related to the washing machine 1000.

Hereinafter, an operation method of the washing machine management system for remotely controlling the washing machine 1000 will be described with reference to operations S1901 to S1920.

In operation S1901, the mobile device 2000 may receive an input of the user for activating a remote control mode of the washing machine. For example, the mobile device 2000 may display, on an application execution window, an inquiry screen for activating the remote control mode of the washing machine 1000. When the user selects "Yes" or "No" on the displayed inquiry screen, the mobile device 2000 may receive an input regarding whether to start the remote control mode of the washing machine 1000.

In operation S1902, the mobile device 2000 may transmit, to the server 3000, a request to activate the remote control mode of the washing machine.

In operation S1903, the server 3000 may transmit, to the washing machine 1000, the request to activate the remote control mode of the washing machine.

In operation S1904, based on receiving the request to activate the remote control mode, the washing machine 1000 may control the washing machine 1000 to be powered on.

In operation S1905, based on being powered on, the washing machine 1000 may identify, through the door sensor 1810, whether the door is closed. The washing machine 1000 may identify, through the door sensor 1810, whether the door is closed or opened.

In operation S1906, the washing machine 1000 may transmit, to the server 3000, information about the state of the door. For example, the washing machine 1000 may transmit information indicating that the door is closed or opened. The server 3000 may receive, from the washing machine 1000, the information about the state of the door.

In operation S1907, the server 3000 may transmit, to the mobile device 2000, the information about the state of the door. For example, the server 3000 may transmit the information indicating that the door is closed or opened. The mobile device 2000 may receive the information about the state of the door.

In operation S1908, based on receiving, from the server 3000, the information indicating that the door is opened, the mobile device 2000 may output, on an application execution window, a message for requesting to close the door. For example, the mobile device 2000 may display a message stating "Please close the door".

In operation S1909, based on receiving, from the server 3000, the information indicating that the door is closed, the mobile device 2000 may output, on the application execution window, a message for notifying of waiting for checking the inside of the washing machine. For example, the mobile device 2000 may display a message stating "Checking the inside of the washing machine".

In operation S1910, the washing machine 1000 may identify, through the living creature sensor 1300, whether a living creature exists inside the washing machine 1000. The washing machine 1000 may identify, through the living creature sensor 1300, the presence or absence of a living creature inside the washing machine 1000.

In operation S1911, the washing machine 1000 may transmit, to the server 3000, information about whether a living creature exists inside the washing machine 1000. For example, the washing machine 1000 may transmit information about the presence or absence of a living creature. The server 3000 may receive, from the washing machine 1000, the information about whether a living creature exists.

In operation S1912, the server 3000 may transmit, to the mobile device 2000, the information about whether a living creature exists inside the washing machine 1000. For example, the server 3000 may transmit the information about the presence or absence of a living creature inside the washing machine 1000. The mobile device 2000 may receive the information about whether a living creature exists inside the washing machine 1000.

In operation S1913, based on receiving, from the server 3000, the information about the presence of a living creature, the mobile device 2000 may output, on the application execution window, a message for requesting to check laundry. For example, the mobile device 2000 may display a message stating "Living creature has been detected. Please check the laundry".

In operation S1914, based on receiving, from the server 3000, the information about the absence of a living creature, the mobile device 2000 may receive an input of the user related to a washing operation, as a remote control button is activated. For example, the mobile device 2000 may activate the remote control button for the washing machine 1000, and receive a remote control input of the user related to the washing machine 1000. The remote control button may include, for example, a washing operation of the washing machine 1000, wash options, and initiation of a washing operation. When the remote control button is activated in the mobile device 2000, a shadow of an area including the remote control button may be removed.

In operation S1915, the mobile device 2000 may transmit, to the server 3000, the remote control command related to the washing operation.

In operation S1916, the server 3000 may transmit, to the washing machine 1000, the remote control command related to the washing operation.

In operation S1917, the washing machine 1000 may receive the remote control command related to the washing operation. In operation S1918, the washing machine 1000 may perform the washing operation based on the remote control command.

In operation S1919, the washing machine 1000 may transmit laundry progress status information to the mobile device 2000 through the server 3000, and the mobile device 2000 may output, on the application execution window, the laundry progress status information.

In operation S1920, after the washing operation is completed, the washing machine 1000 may output a wash completion message through the user interface 1400.

In operation S1921, the washing machine 1000 may transmit wash completion information to the mobile device 2000 through the server 3000, and the mobile device 2000 may output, on the application execution window, the wash completion message.

The washing machine 1000 according to an embodiment of the disclosure may include the cabinet 10 forming the exterior of the washing machine 1000, the tub 20 formed inside the cabinet 10, the living creature sensor 1300 configured to detect, through a millimeter-wave (mmWave) radar, a living creature inside the washing machine 1000, the communication interface 1200 configured to communicate with an external device, and at least one processor 1100. The at least one processor 1100 may receive a request to activate a remote control mode of the washing machine 1000, from the external device through the communication interface 1200. The at least one processor 1100 may activate the living creature sensor 1300 in response to the request. The at least one processor 1100 may receive, from the living creature sensor 1300, a detection signal regarding the presence or absence of a living creature inside the washing machine 1000. Based on the received detection signal, the at least one processor 1100 may transmit information about whether a living creature exists inside the washing machine 1000, to the external device through the communication interface 1200.

The washing machine 1000 according to an embodiment of the disclosure may perform a washing operation after confirming whether a living creature exists inside the washing machine 1000. The washing machine 1000 according to an embodiment of the disclosure may perform a washing operation according to a remote control command of a user while complying with safety standards, thereby improving user convenience.

The living creature sensor 1300 may be inclined at the first angle 501 or 640 toward the inside of the washing machine 1000.

The living creature sensor 1300 may be formed inside the housing 600 formed of a plastic material.

The washing machine 1000 may further include the diaphragm 30 formed between the tub 20 and the cabinet 10 and including the through hole 31. The living creature sensor 1300 may be positioned in the through hole 31 of the diaphragm 30.

The washing machine 1000 may include the light source module 1700 formed in the through hole 31 of the diaphragm 30. The light source module 1700 may be mounted on the printed circuit board 730 on which the living creature sensor 1300 is mounted.

The at least one processor 1100 may, based on the detection signal received from the living creature sensor 1300 being greater than or equal to a threshold level, transmit, to the external device, information about the presence of a living creature inside the washing machine 1000, and based on the detection signal received from the living creature sensor 1300 being less than the threshold level, transmit, to the external device, information about the absence of a living creature inside the washing machine 1000.

The at least one processor 1100 may transmit, to the external device, information about whether a living creature exists inside the washing machine 1000, based on a distance value between the living creature and the living creature sensor 1300 received from the living creature sensor 1300.

The at least one processor 1100 may receive, from the external device, a remote control command related to a washing operation, as the information about the absence of a living creature inside the washing machine 1000 is transmitted to the external device.

Based on receiving the remote control command related to the washing operation, the at least one processor 1100 may receive again, from the living creature sensor 1300, a detection signal regarding the presence of absence of a living creature inside the washing machine 1000. The at least one processor 1100 may transmit, to the external device, information about whether a living creature exists inside the washing machine 1000, based on the received detection signal. The at least one processor 1100 may perform the washing operation corresponding to the remote control command.

Based on receiving a request to activate the remote control mode of the washing machine 1000, the at least one processor 1100 may control the washing machine 1000 to be powered on.

The washing machine 1000 may include the door 50 installed in the washing machine 1000 to open and close an inlet through which laundry is input, and the door sensor 1810 configured to detect whether the door 50 is closed or opened. Based on the washing machine 1000 being powered on, the at least one processor 1100 may identify, through the door sensor 1810, whether the door 50 is closed. Based on identifying that the door 50 is closed, the at least one processor 1100 may activate the living creature sensor 1300.

Based on identifying that the door 50 is opened based on an output signal of the door sensor 1810, the at least one processor 1100 may transmit, to the external device through the communication interface 1200, information indicating that the door 50 is opened.

The external device may include the server 3000 or the mobile device 2000 of the user connected through the server 3000.

A method of controlling the washing machine 1000 according to an embodiment of the disclosure may include receiving, from an external device through the communication interface 1200 of the washing machine 1000, a request to activate a remote control mode of the washing machine 1000, in response to the request, activating the living creature sensor 1300 configured to detect, through a millimeter-wave radar, a living creature inside the washing machine 1000, receiving, from the living creature sensor 1300, a detection signal regarding the presence or absence of a living creature inside the washing machine 1000, and based on the received detection signal, transmitting, to the external device through the communication interface 1200, information about whether a living creature exists inside the washing machine 1000.

The washing machine 1000 according to an embodiment of the disclosure may perform a washing operation after identifying whether a living creature exists inside the washing machine 1000. The washing machine 1000 according to an embodiment of the disclosure may perform a washing operation according to a remote control command of a user while complying with safety standards, thereby improving user convenience.

The transmitting of the information about whether a living creature exists inside the washing machine 1000 to the external device may include, based on the detection signal received from the living creature sensor 1300 being greater than or equal to a threshold level, transmitting, to the external device, information about the presence of a living creature inside the washing machine 1000, and based on the detection signal received from the living creature sensor 1300 being less than the threshold level, transmitting, to the external device, information about the absence of a living creature inside the washing machine 1000.

The transmitting of the information about whether a living creature exists inside the washing machine 1000 to the external device may include, based on receiving, from the living creature sensor 1300, a distance value between the living creature and the living creature sensor 1300, transmitting, to the external device, the information about whether a living creature exists inside the washing machine 1000.

The method of controlling the washing machine 1000 according to an embodiment of the disclosure may further include receiving, from the external device, a remote control command related to a washing operation, as the information about the absence of a living creature inside the washing machine 1000 is transmitted to the external device.

The method of controlling the washing machine 1000 according to an embodiment of the disclosure may further include, based on receiving the remote control command related to the washing operation, receiving again, from the living creature sensor 1300, a detection signal regarding the presence or absence of a living creature inside the washing machine 1000, based on the received detection signal, transmitting, to the external device, information about the presence or absence of a living creature inside the washing machine 1000, and performing the washing operation corresponding to the remote control command.

The method of controlling the washing machine 1000 according to an embodiment of the disclosure may further include, based on receiving a request to activate the remote control mode of the washing machine 1000, controlling the washing machine 1000 to be powered on.

The method of controlling the washing machine 1000 according to an embodiment of the disclosure may further include, based on the washing machine 1000 being powered on, identifying, through the door sensor 1810 configured to detect whether the door 50 of the washing machine 1000 is closed or opened, whether the door 50 is closed, and based on identifying that the door 50 is closed, activating the living creature sensor 1300.

A machine-readable storage medium may be provided in the form of a non-transitory storage medium. Here, the term 'non-transitory storage medium' refers to a tangible device and does not include a signal (e.g., an electromagnetic wave), and the term 'non-transitory storage medium' does not distinguish between a case where data is stored in a storage medium semi-permanently and a case where data is stored temporarily. For example, the non-transitory storage medium may include a buffer in which data is temporarily stored.

According to an embodiment of the disclosure, the methods according to various embodiments disclosed herein may be included in a computer program product and then provided. The computer program products may be traded as commodities between sellers and buyers. The computer program product may be distributed in the form of a machine-readable storage medium (e.g., a compact disc read-only memory (CD-ROM), or may be distributed online (e.g., downloaded or uploaded) through an application store or directly between two user devices (e.g., smart phones). In a case of online distribution, at least a portion of the computer program product (e.g., a downloadable app) may be temporarily stored in a machine-readable storage medium such as a manufacturer's server, an application store's server, or a memory of a relay server.

The invention claimed is:

1. A washing machine comprising:
   a cabinet forming an exterior of the washing machine;
   a drum inside the cabinet;
   a living creature sensor configured to produce a detection signal, through a millimeter-wave (mmWave) radar, indicating whether a living creature exists inside the drum;
   a communication interface configured to communicate with an external device; and
   at least one processor configured to:
      based on a request to activate capability of the washing machine to be remotely controlled by the external device received from the external device through the communication interface, activate the living creature sensor,
      based on the detection signal produced by the activated living creature sensor indicating that a living creature does not exist inside the drum, transmit, to the external device through the communication interface, information indicating that a living creature does not exist inside the drum, and allow the capability of the washing machine to be remotely controlled by the external device, and
      based on the detection signal produced by the activated living creature sensor indicating that a living creature exists inside the drum, transmit, to the external device through the communication interface, information to prevent the capability of the washing machine to be remotely controlled by the external device.

2. The washing machine of claim 1, wherein the living creature sensor is inclined at an angle from a horizontal direction and toward an inside of the drum.

3. The washing machine of claim 1, further comprising:
   a housing including a plastic material, wherein the living creature sensor is inside the housing.

4. The washing machine of claim 1, further comprising:
   a tub in the cabinet, and in which the drum is arranged; and
   a diaphragm between the tub and the cabinet, and including a through hole,
   wherein the living creature sensor is in the through hole of the diaphragm.

5. The washing machine of claim 4, further comprising:
   a light source module in the through hole of the diaphragm; and
   a printed circuit board,
   wherein the light source module and the living creature sensor are mounted on the printed circuit board.

6. The washing machine of claim 1, wherein the information to prevent the capability of the washing machine to be remotely controlled by the external device includes information indicating that a living creature exists inside the drum.

7. The washing machine of claim 1, wherein the at least one processor is further configured to:
   based on the request to activate the capability of the washing machine to be remotely controlled by the external device being received, control the washing machine to be powered on.

8. The washing machine of claim 7, further comprising:
   a door configured to open and close an inlet through which laundry is receivable into the drum; and
   a door sensor configured to detect whether the door is closed or opened,
   wherein the at least one processor is further configured to:
      based on the washing machine being powered on, identify, through the door sensor, whether the door is closed, and,
      based on identifying that the door is closed, activate the living creature sensor.

9. The washing machine of claim 8, wherein the at least one processor is further configured to:
   based on identifying that the door is opened based on an output signal of the door sensor, transmit, to the external device through the communication interface, information indicating that the door is opened.

10. The washing machine of claim 1, wherein the external device includes a server or a mobile device of a user connected through the server.

11. A method of controlling a washing machine that includes a cabinet forming an exterior of the washing machine, a drum inside the cabinet, a living creature sensor configured to produce a detection signal, through a millimeter-wave (mmWave) radar, indicating whether a living creature exists inside the drum, and a communication interface configured to communicate with an external device, the method comprising:
   based on a request to activate capability of the washing machine to be remotely controlled by the external device received from the external device through the communication interface, activating the living creature sensor,
   based on the detection signal produced by the activated living creature sensor indicating that a living creature does not exist inside the drum, transmitting, to the external device through the communication interface, information indicating that a living creature does not exist inside the drum, and allowing the capability of the washing machine to be remotely controlled by the external device, and
   based on the detection signal produced by the activated living creature sensor indicating that a living creature exists inside the drum, transmitting, to the external device through the communication interface, information to prevent the capability of the washing machine to be remotely controlled by the external device.

12. The method of claim 11, wherein the information to prevent the capability of the washing machine to be remotely controlled by the external device includes information indicating that a living creature exists inside the drum.

13. The method of claim 11, wherein the detection signal produced by the living creature sensor is based on a distance value from the living creature sensor measured by the living creature sensor.

14. The method of claim 11, further comprising:
based on the request to activate the capability of the washing machine to be remotely controlled by the external device being received, controlling the washing machine to be powered on.

15. The method of claim 14, wherein the washing machine includes a door configured to open and close an inlet through which laundry is receivable into the drum, and a door sensor configured to detect whether the door is closed or opened, and the method further comprising:
based on the washing machine being powered on, identifying, through the door sensor, whether the door is closed, and,
based on identifying that the door is closed, activating the living creature sensor.

16. A washing machine comprising:
a cabinet forming an exterior of the washing machine;
a tub in the cabinet;
a drum in the tub;
a diaphragm between the tub and the cabinet, and including a through hole; and
a living creature sensor in the through hole of the diaphragm and configured to produce a detection signal, through a millimeter-wave (mmWave) radar, indicating whether a living creature exists inside the drum.

17. The washing machine of claim 16, further comprising:
a communication interface configured to communicate with an external device; and
at least one processor configured to:
based on a request to activate a remote control mode of the washing machine received from the external device through the communication interface, activate the living creature sensor, and,
based on the detection signal produced by the activated living creature sensor, transmit, to the external device through the communication interface, information about whether a living creature exists inside the drum.

18. The washing machine of claim 16, further comprising:
a light source module in the through hole of the diaphragm; and
a printed circuit board,
wherein the light source module and the living creature sensor are mounted on the printed circuit board.

* * * * *